US011237749B2

(12) United States Patent
Bansal et al.

(10) Patent No.: US 11,237,749 B2
(45) Date of Patent: Feb. 1, 2022

(54) SYSTEM AND METHOD FOR BACKUP DATA DISCRIMINATION

(71) Applicant: EMC IP Holding Company LLC, Hopkinton, MA (US)

(72) Inventors: Aaditya Rakesh Bansal, Bangalore (IN); Sunil Yadav, Bangalore (IN); Manish Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/434,169

(22) Filed: Jun. 6, 2019

(65) Prior Publication Data

US 2020/0387321 A1 Dec. 10, 2020

(51) Int. Cl.
*G06F 12/00* (2006.01)
*G06F 3/06* (2006.01)
*G06F 11/14* (2006.01)

(52) U.S. Cl.
CPC .......... *G06F 3/0649* (2013.01); *G06F 3/0617* (2013.01); *G06F 3/0673* (2013.01); *G06F 11/1451* (2013.01)

(58) Field of Classification Search
CPC .... G06F 3/0649; G06F 3/0617; G06F 3/0673; G06F 11/1451
See application file for complete search history.

(56) References Cited

U.S. PATENT DOCUMENTS

| | | | | |
|---|---|---|---|---|
| 8,554,918 B1* | 10/2013 | Douglis | ............ | G06F 11/3485 707/640 |
| 9,977,704 B1* | 5/2018 | Chopra | ............ | G06F 11/0709 |
| 10,320,757 B1* | 6/2019 | Seeker-Walker | ..... | H04L 9/0894 |
| 10,417,213 B1* | 9/2019 | Mukku | ............ | G06F 3/0659 |
| 2011/0131185 A1* | 6/2011 | Kirshenbaum | ..... | G06F 11/1448 707/654 |
| 2011/0213928 A1* | 9/2011 | Grube | ............ | G06F 3/065 711/114 |
| 2013/0091536 A1* | 4/2013 | Manjunath | ............ | H04L 63/10 726/1 |
| 2014/0310800 A1* | 10/2014 | Kabra | ............ | G06F 21/78 726/17 |
| 2014/0351632 A1* | 11/2014 | Grube | ............ | G06F 11/1076 714/6.24 |
| 2015/0066865 A1* | 3/2015 | Yara | ............ | G06F 16/21 707/667 |
| 2015/0066866 A1* | 3/2015 | Yara | ............ | G06F 16/2365 707/687 |
| 2015/0242648 A1* | 8/2015 | Lemmey | ............ | G05D 1/0077 726/30 |

(Continued)

*Primary Examiner* — Prasith Thammavong
(74) *Attorney, Agent, or Firm* — Chamberlain, Hrdlicka, White, Williams & Aughtry

(57) ABSTRACT

A remote agent for providing data protection services includes persistent storage and a backup orchestrator. The persistent storage stores lifecycle policies. The backup orchestrator instantiates a backup agent in a client in response to a backup generation for the client, the backup generation is specified by the lifecycle policies; using the backup agent: generating a backup including backup data for the client and backup metadata that associates portions of the backup data with respective persons; and storing the backup in backup storage based on the lifecycle policies.

17 Claims, 17 Drawing Sheets

(56) References Cited

U.S. PATENT DOCUMENTS

| | | | |
|---|---|---|---|
| 2016/0132521 A1* | 5/2016 | Reininger | G06F 16/156 |
| | | | 707/739 |
| 2016/0179416 A1* | 6/2016 | Mutha | G06F 3/0619 |
| | | | 711/162 |
| 2018/0067848 A1* | 3/2018 | Baldwin | G06F 21/85 |
| 2018/0157860 A1* | 6/2018 | Nair | G06F 9/45558 |
| 2018/0159729 A1* | 6/2018 | Deshmukh | H04L 61/1511 |
| 2018/0225177 A1* | 8/2018 | Bhagi | G06F 16/21 |
| 2019/0205056 A1* | 7/2019 | Halstuch | G06F 3/0605 |
| 2019/0332683 A1* | 10/2019 | Thummala | H04L 63/102 |
| 2019/0354708 A1* | 11/2019 | Fisher | G06F 3/0623 |

\* cited by examiner

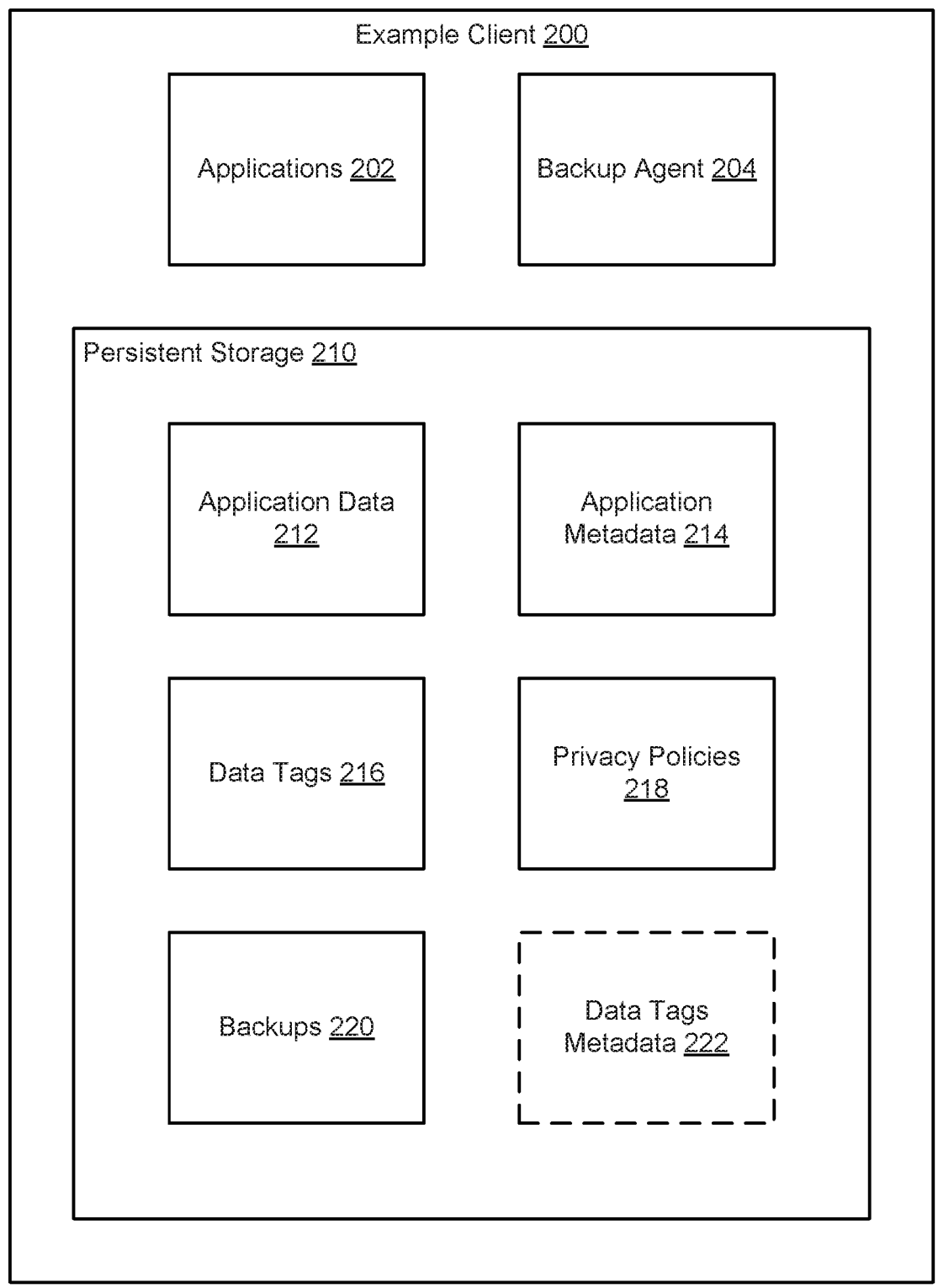
FIG. 2.1

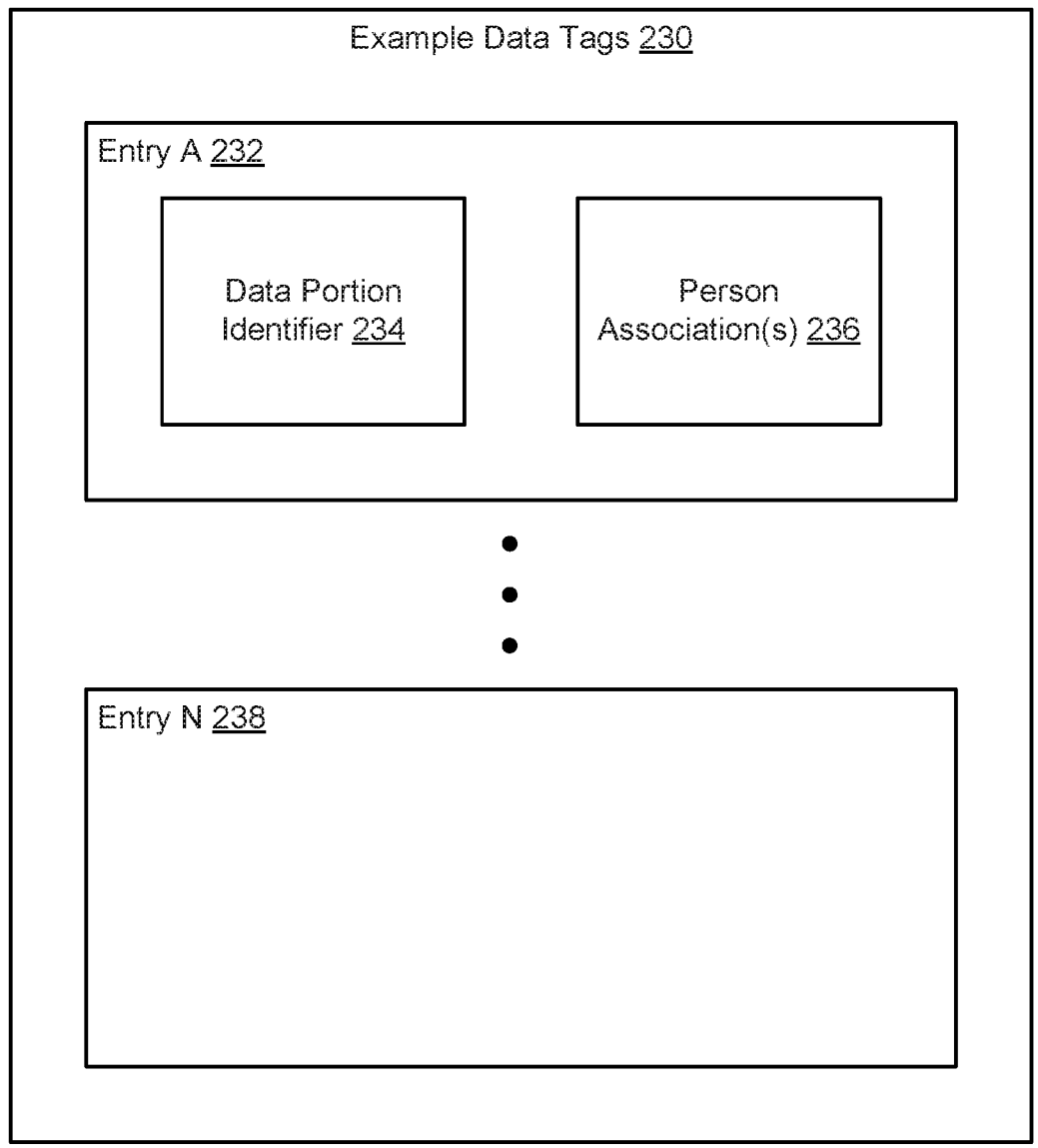
FIG. 2.2

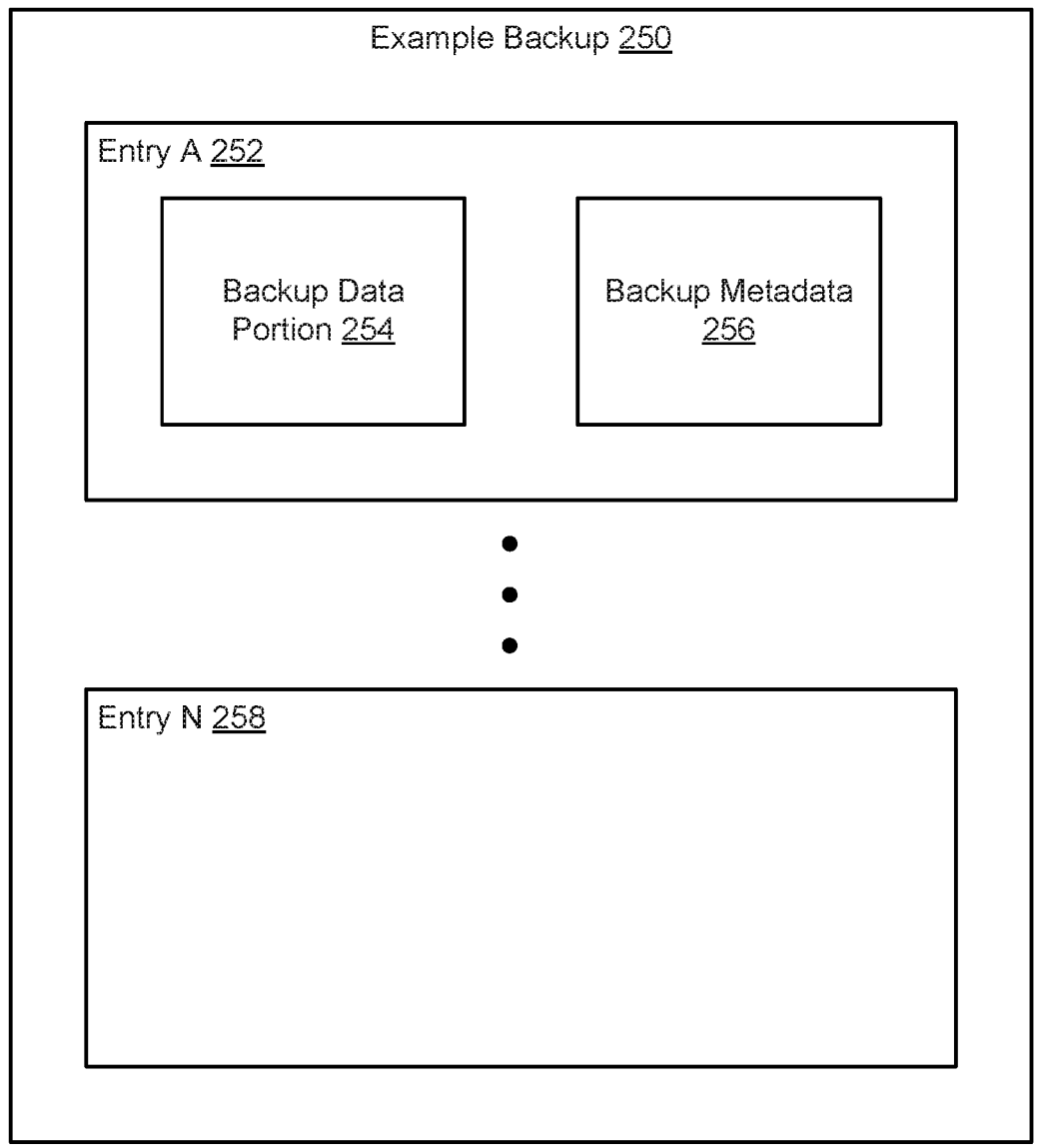
FIG. 2.3

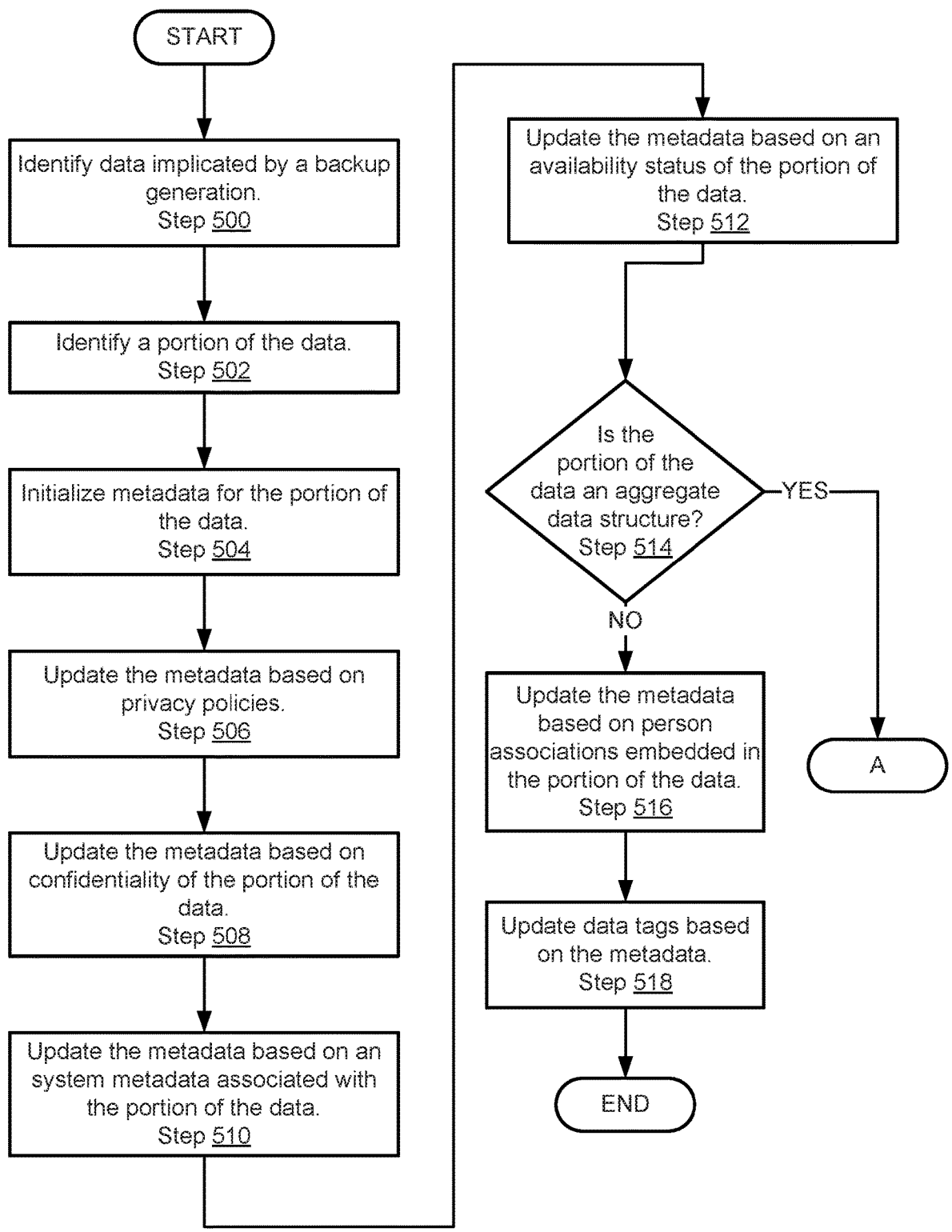
FIG. 5.1

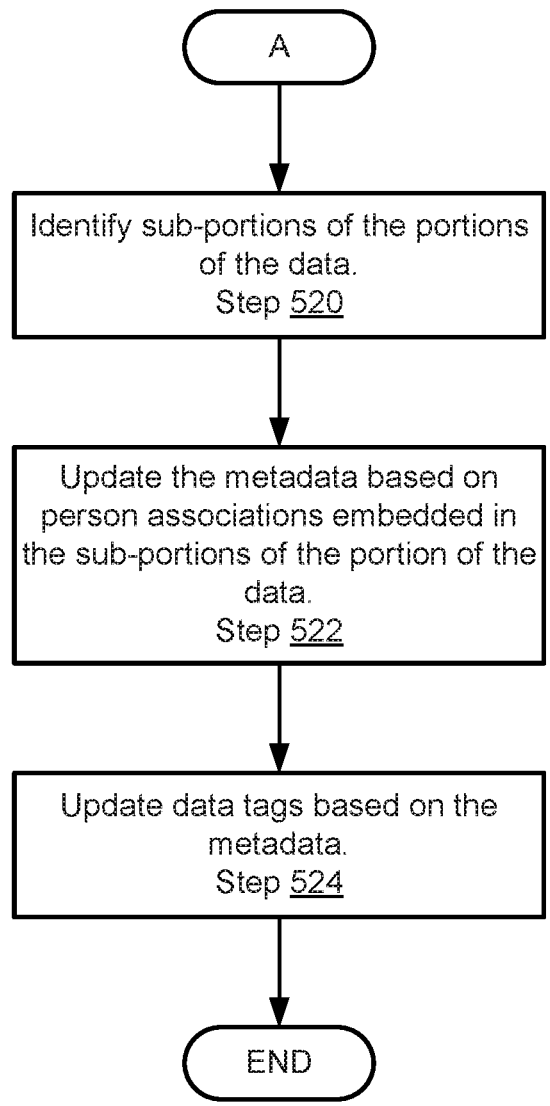
FIG. 5.2

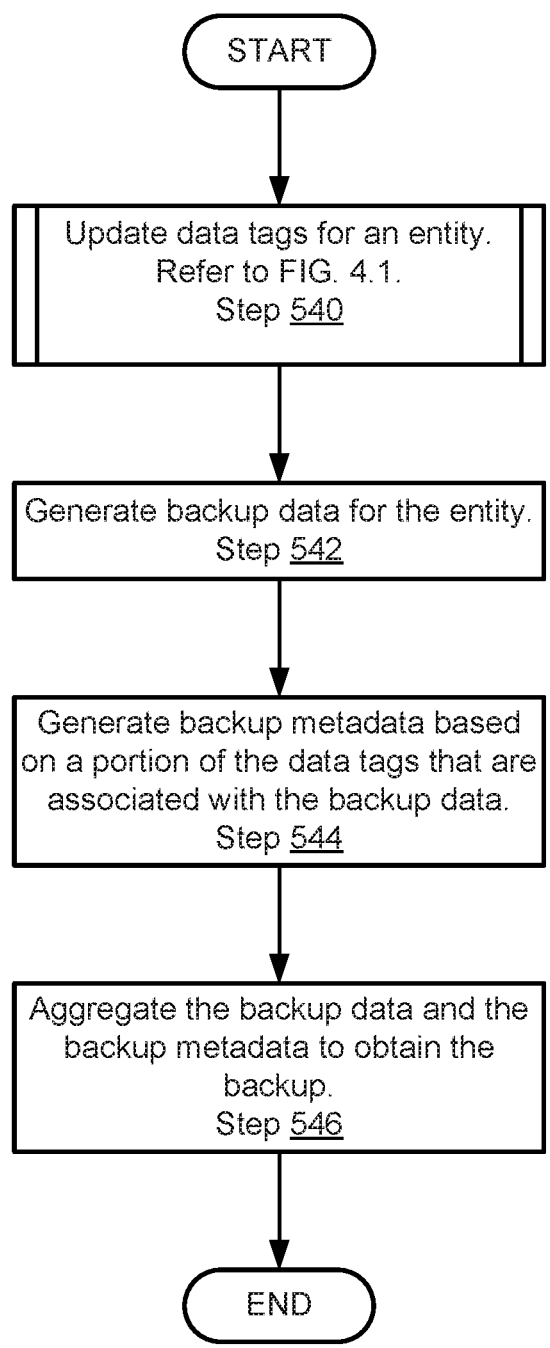
FIG. 5.3

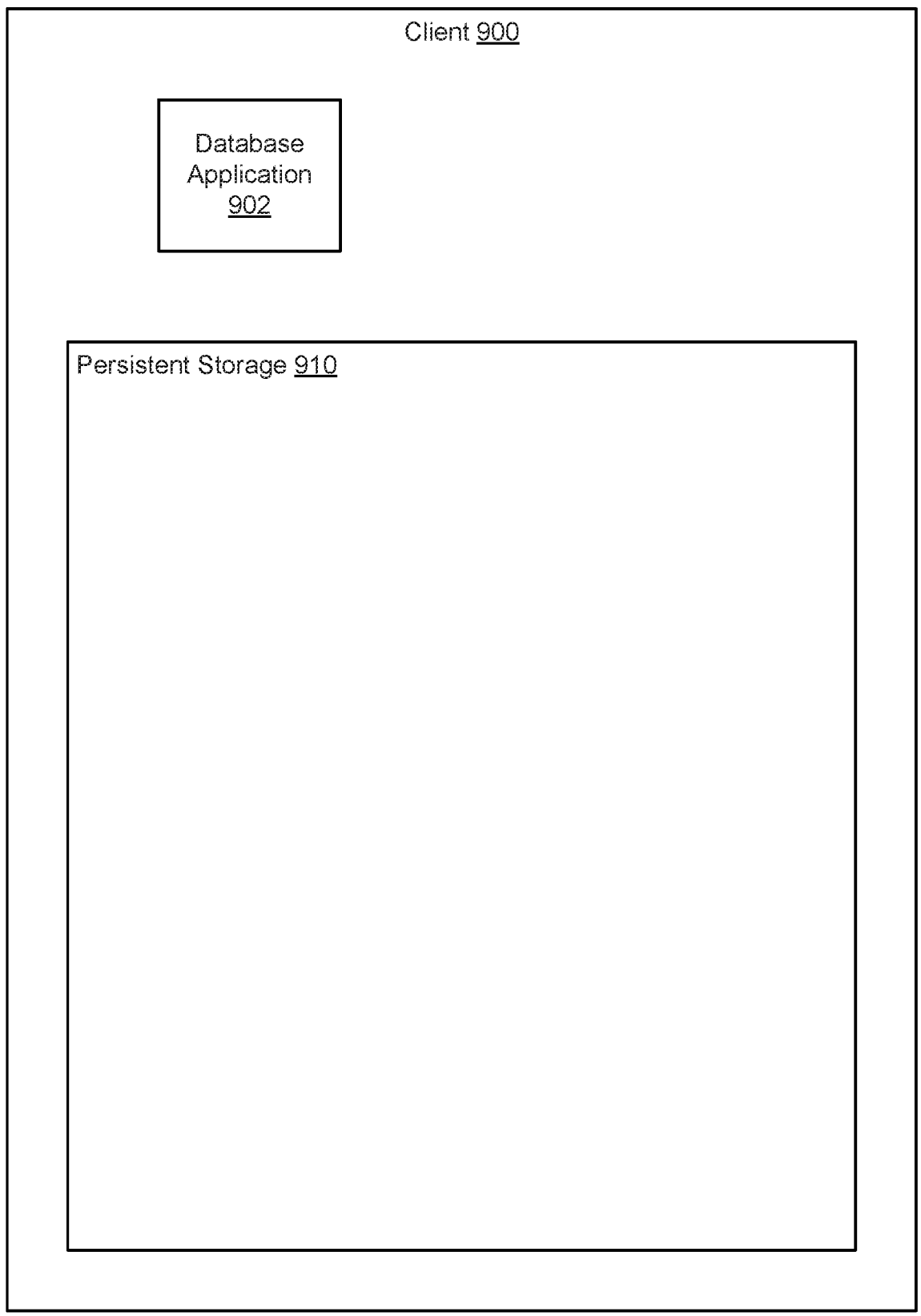
FIG. 9.1

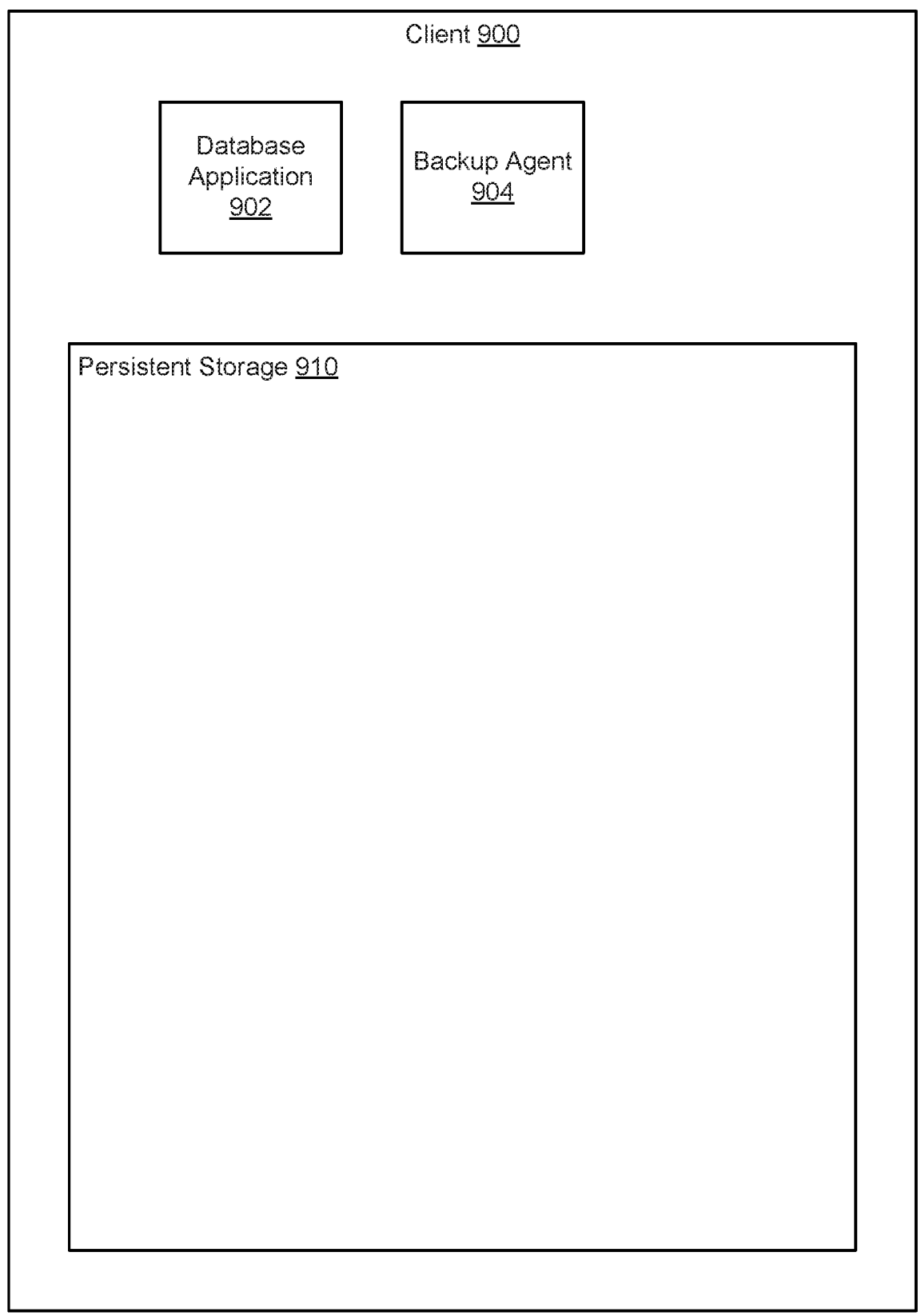
FIG. 9.2

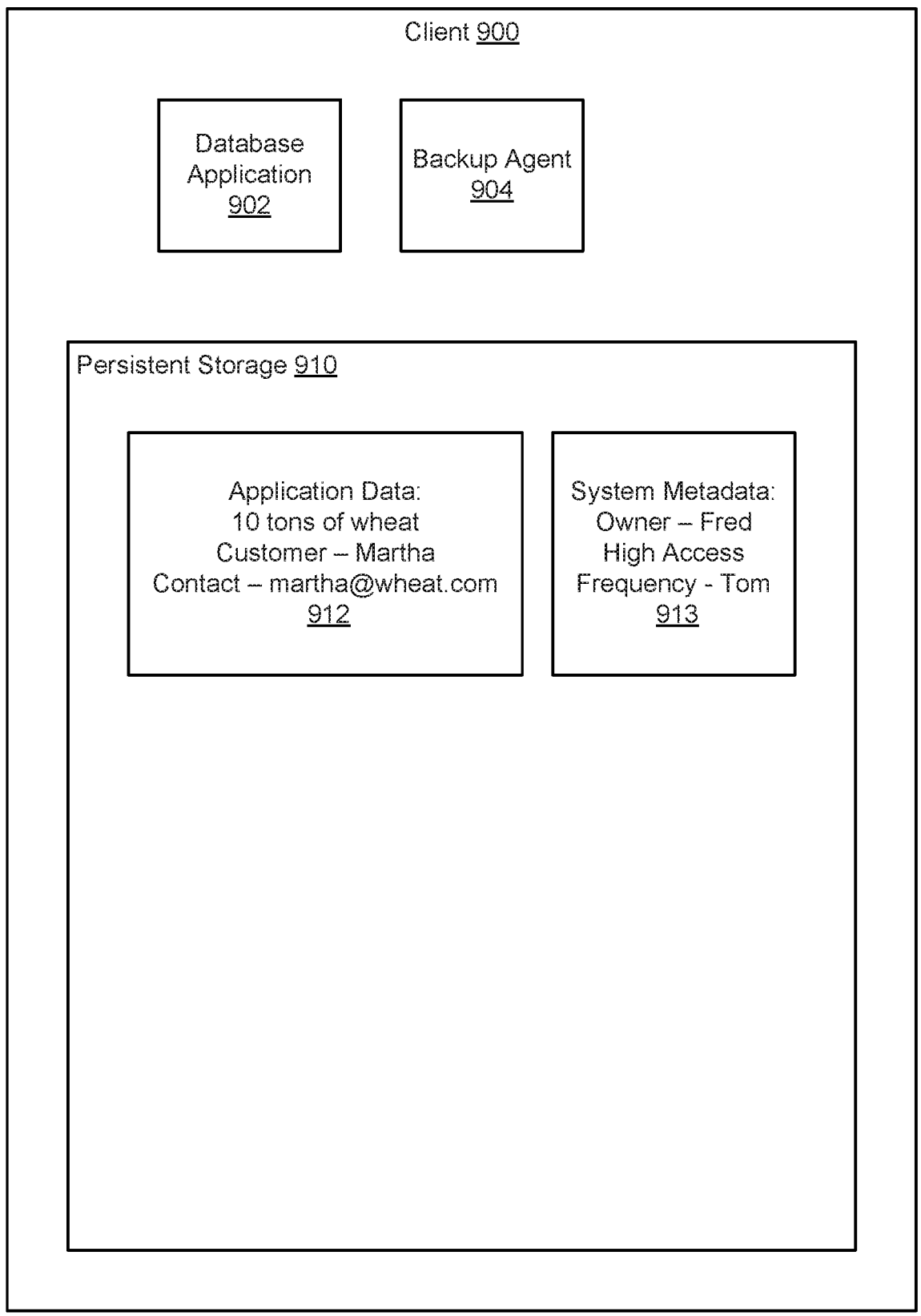
FIG. 9.3

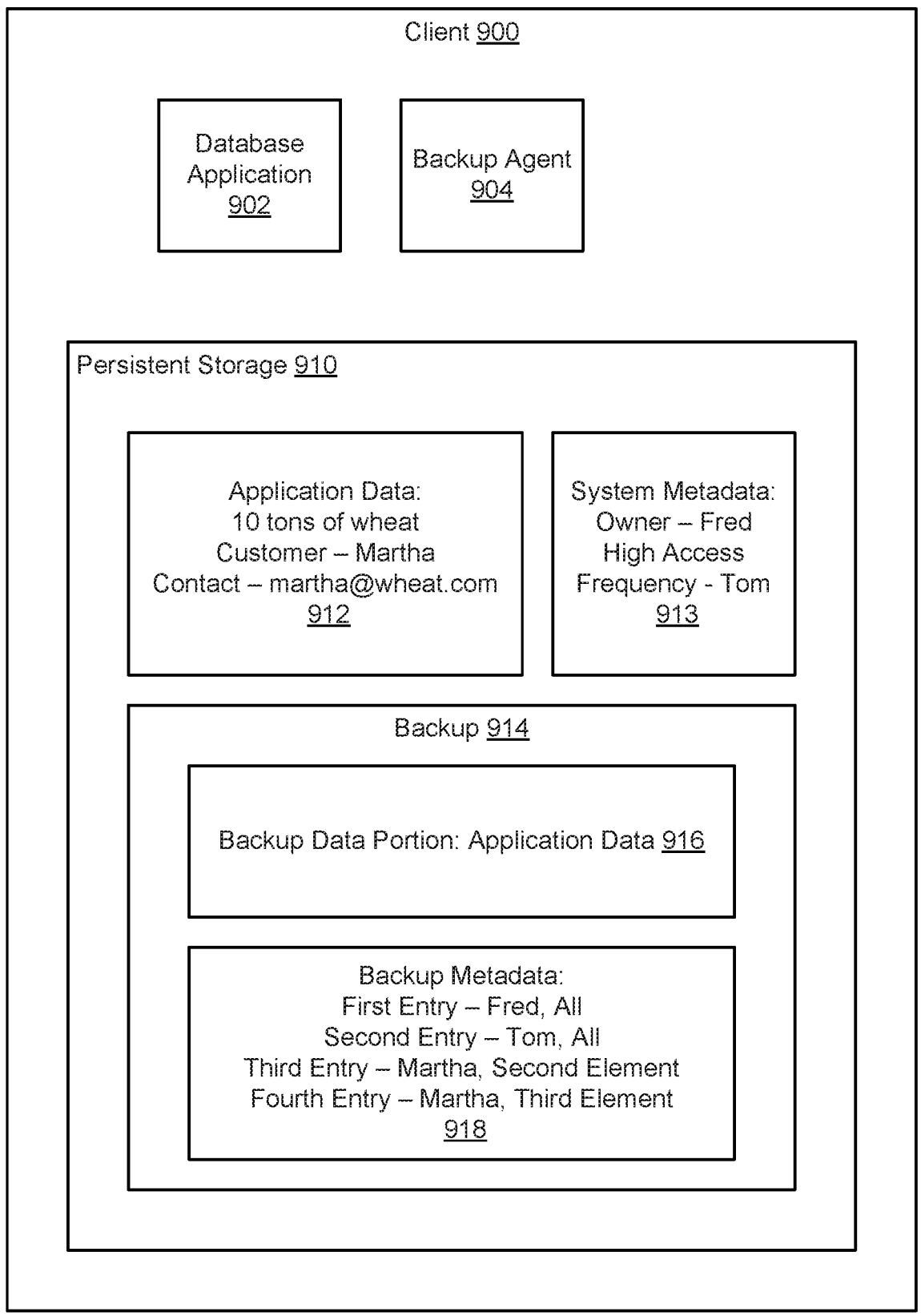
FIG. 9.4

SYSTEM AND METHOD FOR BACKUP DATA DISCRIMINATION

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is generated, it may include information associated with different individuals. For example, a database may include personal information regarding employees of a company. The personal information may be names, salaries, addresses, or other types of information regarding different individuals.

SUMMARY

In one aspect, a remote agent for providing data protection services in accordance with one or more embodiments of the invention includes persistent storage and a backup orchestrator. The persistent storage stores lifecycle policies. The backup orchestrator instantiates a backup agent in a client in response to a backup generation for the client, the backup generation is specified by the lifecycle policies; using the backup agent: generating a backup including backup data for the client and backup metadata that associates portions of the backup data with respective persons; and storing the backup in backup storage based on the lifecycle policies.

In one aspect, a method for providing data protection services based on lifecycle policies in accordance with one or more embodiments of the invention includes instantiating a backup agent in a client in response to a backup generation for the client, the backup generation is specified by the lifecycle policies; using the backup agent: generating a backup including backup data for the client and backup metadata that associates portions of the backup data with respective persons; and storing the backup in backup storage based on the lifecycle policies.

In one aspect, a non-transitory computer readable medium in accordance with one or more embodiments of the invention includes computer readable program code, which when executed by a computer processor enables the computer processor to perform a method for providing data protection services based on lifecycle policies. The method includes instantiating a backup agent in a client in response to a backup generation for the client, the backup generation is specified by the lifecycle policies; using the backup agent: generating a backup including backup data for the client and backup metadata that associates portions of the backup data with respective persons; and storing the backup in backup storage based on the lifecycle policies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example client in accordance with one or more embodiments of the invention.

FIG. 2.2 shows a diagram of example data tags in accordance with one or more embodiments of the invention.

FIG. 2.3 shows a diagram of an example backup in accordance with one or more embodiments of the invention.

FIG. 5.1 shows a flowchart of a method of updating data tags in accordance with one or more embodiments of the invention.

FIG. 5.2 shows a continuation of the flowchart of FIG. 5.1.

FIG. 5.3 shows a flowchart of a method of obtaining a backup in accordance with one or more embodiments of the invention.

FIGS. 9.1-9.4 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that provides data protection services while also personal information search services for backups generated and stored for data protection purposes.

In one or more embodiments of the invention, the personal information search services are provided by distributing the computational load for providing such search services across multiple computing devices. For example, clients for which the data protection services are provided, may pre-process backups to identify personal information within the backups. Such information may be provided, along with the backups, to backup storages to enable the backup storages to provide computationally efficient personal information search services while storing the backups in a storage resource efficient format, i.e., a low storage resource footprint format.

Additionally, embodiments of the invention may enable distributed systems to comply with regulatory requirements regarding the use of personal information. For example, the distributed system may utilize the computationally efficient personal information search services provided by the backup storages to comply with the regulatory requirements.

Figure 1:
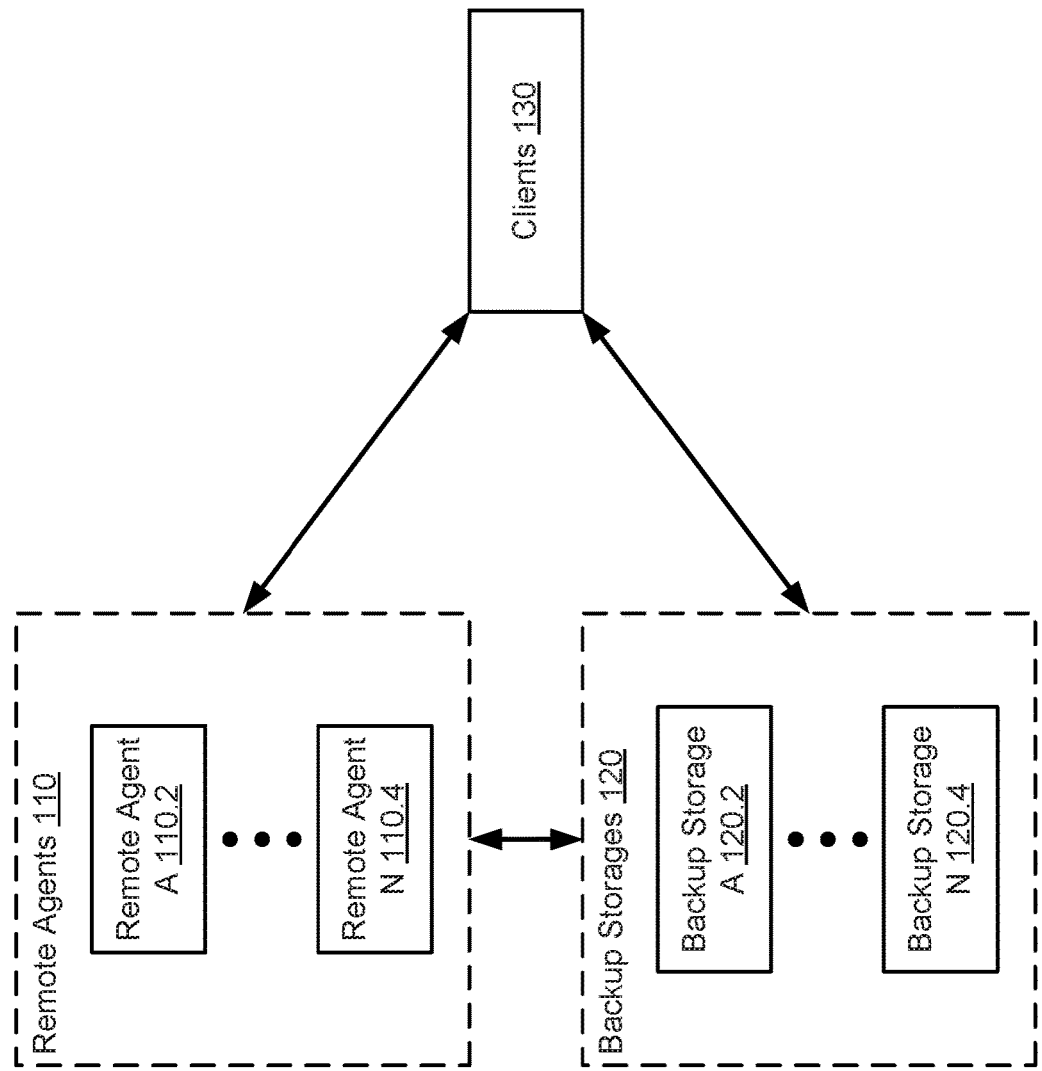
FIG. 1 shows a diagram of a system in accordance with one or more embodiments of the invention.

FIG. 1 shows an example system in accordance with one or more embodiments of the invention. The system may include clients (130) that obtain data protection services from remote agents (110). The data protection services may include generating backups for the clients (130) and storing the backups in backup storages (120) for future use. The data protection services may further include restoring the clients (130) utilizing backups stored in the backup storages.

Prior to storing the generated backups in the backup storages (120), the backups may be modified to include information regarding relationships between different portions of the backups and persons. The clients (130) may identify the relationships between the different portions of the backups and the persons based on information included in the data upon which the portions of the backups are generated, system metadata regarding the data upon which the portions of the backups are generated, privacy policies of an organization to which the client belongs, and/or other information.

When the backups are stored in the backup storages (120), the information regarding relationships between different portions of the backups and the persons may be used to store the backups in a format that enables portions of the backups associated with a particular person to be identified. By doing so, information associated with the person may be easily identified after the backups are stored in backup storages.

The components of the system illustrated in FIG. 1 may be operably connected to each other and/or operably connected to other entities (not shown) via any combination of wired and/or wireless networks. Each component of the system illustrated in FIG. 1 is discussed below.

The clients (130) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-5.3. The clients (130) may be other types of computing devices without departing from the invention. For additional details regarding computing devices, refer to FIG. 10.

The clients (130) may be logical devices without departing from the invention. For example, the clients (130) may be virtual machines that utilize computing resources of any number of physical computing devices to provide the functionality of the clients (130). The clients (130) may be other types of logical devices without departing from the invention.

In one or more embodiments of the invention, the clients (130) utilize data protection services provided by the remote agents (110). To use the data protection services, the clients (130) may perform actions under the directions of the remote agents (110). By doing so, the remote agents (110) may orchestrate the generation and storage of backups in the backup storages (120). For additional details regarding the clients (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 6-7. The backup storages (120) may be other types of computing devices without departing from the invention. For additional details regarding computing devices, refer to FIG. 10.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the clients (130). The data storage services may include storing of data provided by the clients (130) and providing of previously stored data to the clients (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the backup storages (120) provide personal data search services. Personal data search services may include identifying data stored in the backup storages (120) that is associated with a particular person. Personal data search services may be used, for example, to facilitate compliance with regulations on the storage and/or use of personal data. Personal data may include data that, for example, is in regards to a particular person. Personal data may be, for example, a name of a person, location information for the person, contact information for the person, economic information regarding the person, or any other type of information that may enable use of the data to provide information regarding a person. For additional details regarding the backup storages, refer to FIG. 3.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the remote agents (110) described through this application and all, or a portion, of the methods illustrated in FIG. 8. The remote agents (110) may be other types of computing devices without departing from the invention. For additional details regarding computing devices, refer to FIG. 10.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) are distributed devices that include components distributed across any number of separate and/or distinct computing devices. In such a scenario, the functionality of the remote agents (110) may be performed by multiple, different computing devices without departing from the invention.

In one or more embodiments of the invention, the backup storages (120) provide the functionality of the remote agents. For example, the backup storages (120) may host applications that provide all, or a portion, of the functionality of the remote agents (110). The functionality of the remote agents (110) may be provided by other components of the system of FIG. 1 without departing from the invention.

In one or more embodiments of the invention, the remote agents (110) provide data protection services. Data protection services may include (i) orchestration of generation of backups for the clients, (ii) orchestration of storage of the backups in backup storages, and/or (iii) orchestration of restoration of the clients (130) and/or other entities using backups in the backup storages (120). By doing so, the remote agents (110) may improve the likelihood that stored backups for the clients (130) are available for future use when compared to other methods for providing data protection services. The system of FIG. 1 may include any number of remote agents (e.g., 110.2, 110.4). For additional details regarding remote agents, refer to FIG. 4.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, the clients (130) may generate backups and other information for storage in the backup storages (120). FIG. 2.1 shows a diagram of an example client (200) in accordance with one or more embodiments of the invention. The example client (200) may be similar to any of the clients (130, FIG. 1). As discussed above, the example client (200) may: (i) generate and/or obtain data and/or (ii) obtain and/or participate in data protection services for the example client's data.

To provide the aforementioned functionality of the example client (200), the example client (200) may include applications (202), a backup agent (204), and persistent storage (210). Each component of the example client (200) is discussed below.

The applications (202) may generate application data (212) stored in the persistent storage (210). The applications (202) may provide application services to a user of the example client (200) or other entities. The application services may be any type of computer implemented service. When a user or other entity utilizes the application services provided by the applications (202), information that is relevant to the users and/or other entities may be stored in the application data (212).

For example, an application of the applications (202) may be a database application. A user of the example client (200) may enter information into a database stored as part of the application data (212) when utilizing the services provided by the database application. By doing so, the information included in the application data (212) may be of importance to the user. Consequently, the user may desire access to the information at future points in time. However, the information may be lost if for any reason the application data (212) stored in the persistent storage (210) becomes unreachable.

To address this and other potential issues, the example client (200) may include the backup agent (204). The backup agent (204) may provide data protection services for application data (212) and/or other data hosted by the example client (200). The backup agent (204) may provide data protection services for the example client (200) under the direction of one or more remote agents.

For example, the one or more remote agents may invoke the functionality of the backup agent (204). By doing so, the one or more remote agents may orchestrate the generation and storage of backups in backup storages. Consequently, data that may be used to restore the application data and/or other data of the example client (200) may be maintained in the backup storages.

In one or more embodiments of the invention, data protection services are provided by the backup agent (204) by (i) maintaining data tags (216) associated with different portions of the application data (212) and/or other data of the example client (200), (ii) generating backups (220), (iii) storing the generated backups in backup storage, and/or (iv) utilizing backups stored in backup storage to restore all, or a portion, of the data (e.g., application data (212), other data stored in the persistent storage (210)) of the example client (200). The data protection services may also include utilizing backups stored in the backup storages to instantiate a copy of the application data (212) and/or other data hosted by the example client (200) in other locations.

To maintain the data tags (216), the backup agent (204) may analyze different portions of the data hosted by the example client (200) to determine whether each respective portion of the data includes personal information. If a respective portion of the data includes personal information, the backup agent (204) may generate and/or update a data tag of the data tags (216) to reflect the association. For additional information regarding the data tags (216), refer to FIG. 2.2.

To generate the backups (220), the backup agent (204) may generate a data structure that includes (i) information that enables all, or a portion, of the data of the example client (200) to be restored to a previous state and/or (ii) information that identifies portions of the data structure that include personal information. The backups (220) may be generated using the data (e.g., application data (212) and/or other data hosted by the example client (200)) of the example client (200), the application metadata (214), the privacy policies (218), and/or the data tags metadata (222). For additional details regarding the backups (220), refer to FIG. 2.3.

To provide all, or a portion, of the above noted functionality of the backup agent (204), the backup agent (204) may perform all, or a portion, of the methods illustrated in FIGS. 5.1-5.3.

In one or more embodiments of the invention, all, or a portion, of the applications (202) and/or the backup agent (204) are hardware devices including circuitry. All, or a portion, of the applications (202) and/or the backup agent (204) may be, for example, digital signal processors, field programmable gate arrays, or application specific integrated circuit. All, or a portion, of the applications (202) and/or the backup agent (204) may be other types of hardware devices without departing from the invention.

In one or more embodiments of the invention, all, or a portion, of the applications (202) and/or the backup agent (204) are implemented as computing code stored on a persistent storage that when executed by a processor performs the respective functionalities of the applications (202) and the backup agent (204). The processor may be a hardware processor including circuitry such as, for example, a central processing unit or a microcontroller. The processor may be other types of hardware devices for processing digital information without departing from the invention.

In one or more embodiments of the invention, all, or a portion, of the functionality of the applications (202) and/or the backup agent (204) are provided by special purpose hardware devices. For example, the applications (202) and/or the backup agent (204) may be implemented as computing code stored on a persistent storage that when executed by a processor performs the respective functionalities of the applications (202) and the backup agent (204). When executing the computing code stored on the persistent storage, the processor may invoke functionality of one or more special purpose hardware devices that give rise to a portion of the functionality off the applications (202) and/or the backup agent (204). The special purpose hardware device may be, for example, a programmable gate array, application specific integrated circuit, digital signal process, or other type of hardware device operably connected to the processor.

In one or more embodiments of the invention, the persistent storage (210) provides data storage services to the applications (202), the backup agent (204), and/or other entities. The data storage services may include storing of data and providing of previous stored data. The persistent storage (210) may be a physical storage device or a logical storage device.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

The persistent storage (210) may store data structures including the application data (212), application metadata (214), the data tags (216), the privacy policies (218), the backups (220), data tags metadata (222), and/or other data. Each of these data structures is discussed below.

As noted above, the application data (212) may be one or more data structures that include data generated, maintained by, and/or utilized by the applications (202). The application data (212) may include any quantity and/or type of data.

The application metadata (214) may be a data structure that includes information regarding the application data (212). The application metadata (214) may specify such information at a granular level, i.e., different portions of the application metadata (214) may include metadata for a corresponding portion of the application data (212). The application metadata (214) may include, for example, information regarding a user that generated and/or accessed a portion of the application data (212), information regarding an owner of a portion of the application data (212), when (e.g., a date stamp) a portion of the application data (212) was instantiated, etc. The application metadata (214) may include any quantity of metadata for corresponding portions of the application data (212).

While not illustrated in FIG. 2.1, the persistent storage (210) may store additional metadata regarding corresponding portions of other data structures hosted by the persistent storage (210) and/or stored in other locations without departing from the invention.

The data tags (216) may be data structures that store information associated with different portions of the data of the example client (200) for which data protection services are provided. The information included in each data tag of the data tags may specify whether a corresponding portion of the data includes personal data. If the corresponding portion of the data includes personal data, the information in the respective data tag may specify a sub-portion of the corresponding portion of the data that includes the personal information.

Any number of data tags may include different information associated with a particular portion of the data of the example client (200). For example, a particular portion of the data of the example client (200) may include multiple sub-portions that each includes personal information. Consequently, there may be a number of data tags each including different information regarding corresponding sub-portions of the data of the example client (200) that include respective personal information.

The data tags (216) may also, or alternatively, include information regarding a confidentiality status of corresponding portions of the data of the example client (200). For example, if a portion of the data of the example client (200) includes confidential information, a data tag of the data tags may include information indicating that the portion of the data of the example client (200) includes confidential information.

The data tags (216) may include different information regarding corresponding portions of the data of the example client (200) without departing from the invention. For example, the data tags (216) may include information regarding the relative importance, for data protection services purposes, of a corresponding portion of data of the example client (200).

The privacy policies (218) may be data structures that include information that may be used to determine whether it is likely that portions of data of the example client (200) include personal information. The privacy policies (218) may include heuristically determined rules that may be used to classify different portions of the data of the example client (200) as being likely to include personal data.

For example, consider a scenario in which the privacy policies (218) include a rule that determines that all databases are likely to include personal information. In such a scenario, the privacy policies (218) may cause the backup agent (204) to generate data tags corresponding to the databases of the data of the example client (200) that indicate that the databases are likely to include personal data.

The backups (220) may be data structures that include (i) information that may be used to restore data of the example client (200) and/or (ii) information regarding personal information that is included in the backups (220). For additional information regarding the backups (220), refer to FIG. 2.3.

The data tags metadata (222) may be data structures that include information used to generate the data tags (216). As will be discussed in greater detail below, to generate the data tags (216), information may be derived from the application data (212), the application metadata (214), and/or other data structures hosted by the persistent storage (210). Such information may be stored temporarily in the persistent storage (210) while the data tags (216) are being generated. In some embodiments of the invention, the data tags metadata (222) are only stored in memory. Consequently, the data tags metadata (222) is illustrated in dashing to indicate that such information may not ever be stored in the persistent storage (210).

While the data structures (e.g., 212, 214, 216, 218, 220, 222) are illustrated as separate data structures and have been discussed as including a limited amount of specific information, any of the aforementioned data structures may be divided into any number of data structures, combined with any number of other data structures, and may include additional, less, and/or different information without departing from the invention. Additionally, while illustrated as being stored in the persistent storage (210), any of the aforementioned data structures may be stored in different locations (e.g., in persistent storage of other computing devices) and/or spanned across any number of computing devices (e.g., across the example client (200) and any number of other computing devices, across any number of other computing devices, etc.) without departing from the invention.

While the example client (200) of FIG. 2.1 has been described and illustrated as including a limited number of components for the sake of brevity, a client in accordance with embodiments of the invention may include additional, fewer, and/or different components than those illustrated in FIG. 2.1 without departing from the invention.

To further clarify aspects of embodiments of the invention, diagrams of data structures that may be utilized by the example client (200) are illustrated in FIGS. 2.2-2.3.

FIG. 2.2 shows a diagram of example data tags (230) in accordance with one or more embodiments of the invention. The example data tags (230) may be similar to the data tags (216, FIG. 2.1). As discussed above, the example data tags (230) may be a data structure that includes any number of data tags that each include information associated with corresponding portions of data stored in the example client (200, FIG. 2.1).

The example data tags (230) may be a list that includes any number of entries (232, 238). Each of the entries may be a respective data tag. Each of the entries (232, 238) may include a data portion identifier (234) and corresponding person association(s) (236). The data portion identifier (234) may identify a portion of data to which the entry (e.g., 232) is associated. The data portion identifier (234) may be, for example, access information for the portion of data to which the entry (e.g., 232) is associated.

The person association(s) (236) may include information regarding persons for which the portion of data identified by the data portion identifier (234) includes all, or a portion, of their personal information. For example, the person association(s) (236) may include one or more identifiers of one or more persons. The one or more identifiers may be, for example, all, or a portion, of the persons' names.

While the example data tags (230) has been described as being organized as a list, the data of the example data tags (230) may be organized as different structures without departing from the invention.

FIG. 2.3 shows a diagram of an example backup (250) in accordance with one or more embodiments of the invention. The example backup (250) may be similar to one of the backups (220, FIG. 2.1). As discussed above, the example backup (250) may be a data structure that includes (i) information usable for restoration purposes and (ii) information regarding personal information included in the example backup (250).

The example backup (250) may be a list that includes any number of entries (252, 258). Each of the entries (252, 258) may include a backup data portion (254) and corresponding backup metadata (256). The backup data portion (254) may be a portion of data usable for restoration purposes. The backup data portion (254) may be derived from data of a client for which data protection services are to be provided. For example, the backup data portion (254) may be derived from a portion of application data or other data of a client.

The backup metadata (256) may include information regarding each person for which the backup data portion (254) of the entry (e.g., 252) includes all, or a portion, of their personal information. The information regarding each person may be, for example, names of the persons. The backup metadata (256) may also include access information for each portion of the backup data portion (254) that includes personal information. The access information may be, for example, offsets corresponding to the persons of the backup data portion (254) that includes personal information.

While the example backup (250) has been described as being organized as a list, the data of the example backup (250) may be organized as different structures without departing from the invention.

Figure 3:
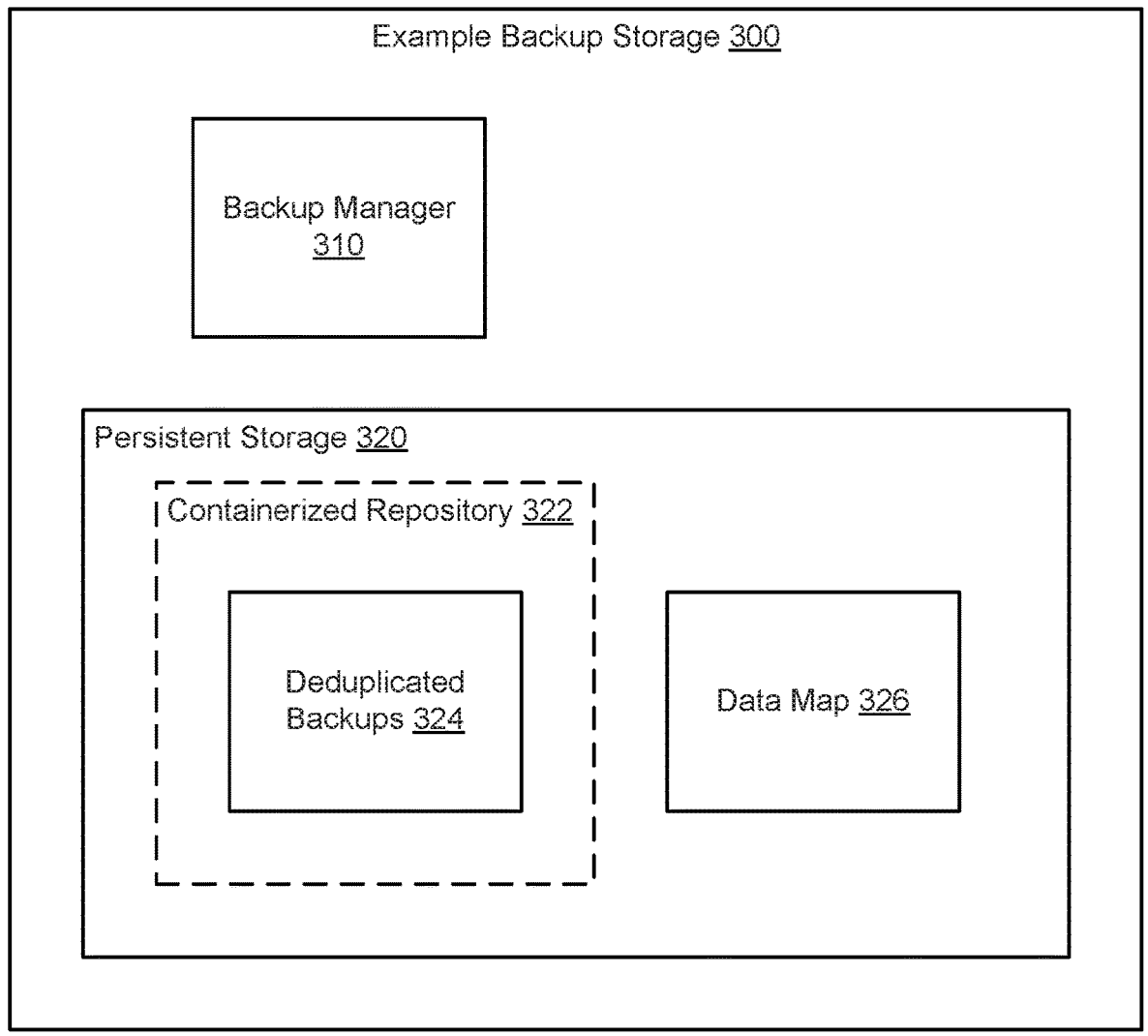
FIG. 3 shows a diagram of an example backup storage in accordance with one or more embodiments of the invention.

As discussed above, the backup storages may store backups of the clients for future use. FIG. 3 shows a diagram of an example backup storage (300) in accordance with one or more embodiments of the invention. The example backup storage (300) may be similar to any of the backup storages (120, FIG. 1). As discussed above, the example backup storage (300) may provide data storage services for the clients (130, FIG. 1).

To provide the aforementioned functionality of the example backup storage (300), the example backup storage (300) may include a backup manager (310) and persistent storage (320). Each component of the example backup storage (300) is discussed below.

The backup manager (310) may (i) provide data storage services and (ii) data search services of backups stored in the example backup storage (300).

To provide data storage services, the backup manager (310) may (i) obtain backups from the clients, (ii) deduplicate backup data included in the backups against data already stored in the example backup storage (300), (iii) store the deduplicated backup data in a containerized repository (322) to obtain deduplicated backups (324) stored in the containerized repository (322), and/or (iv) generate/update a data map (326) using backup metadata included in the backups. By doing so, the example backup storage (300) may store backups in a format that reduces the storage footprint of the backups and/or enable personal data within the deduplicated backups (324) to be efficiently identified.

Deduplicating the backup data in the backups may reduce the storage footprint of the backup data. Further, storing the deduplicated backup data in a containerized repository (322) may further reduce the storage footprint required for storing the backup data. For example, storing the deduplicated backups (324) in the containerized repository (322) may remove any metadata from the backups. By doing so, the storage footprint may be reduced at the cost of eliminating the native ability to search for different portions of the deduplicated backups (324) and/or information regarding the deduplicated backups (324).

To improve the ability of the deduplicated backups (324) to be searched in the containerized repository (322), the backup manager (310) may generate the data map (326). The data map (326) may be a data structure that includes information regarding different portions of the deduplicated backups that include personal information associated with different persons. The data map (326) may also include access information for the portions of the deduplicated backups (324) that include personal information. The data map (326) may include other types of information that enable the portions of the deduplicated backups (324) that include personal information to be manipulated, e.g., modified, removed, etc., without departing from the invention.

Figure 6:
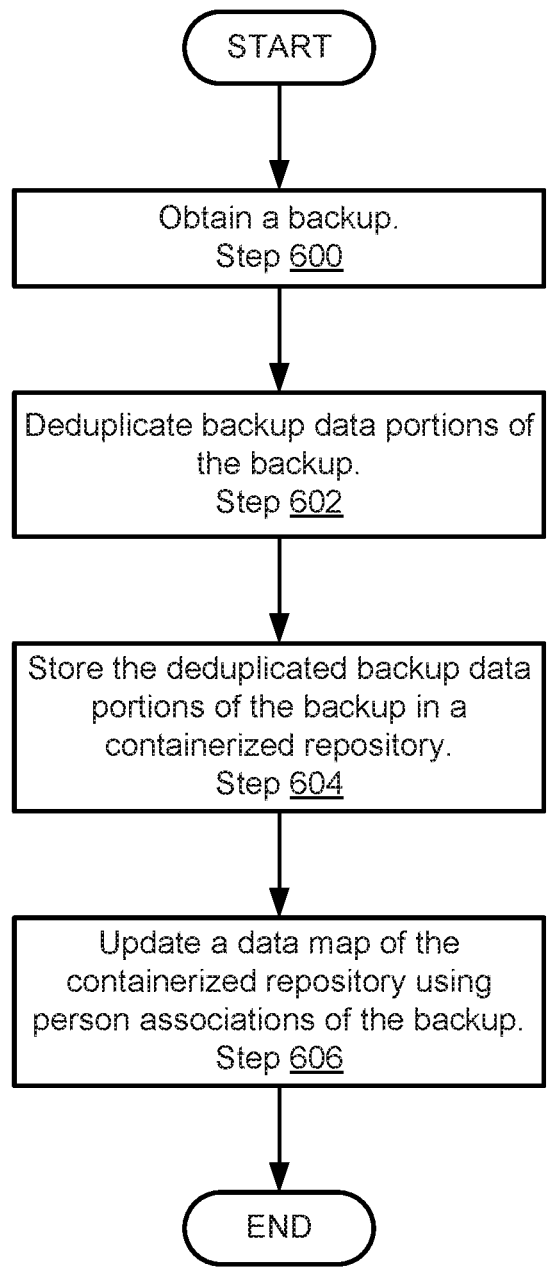
FIG. 6 shows a flowchart of a method of maintaining a data map in accordance with one or more embodiments of the invention.

To provide all, or a portion, of the above noted functionality of the backup manager (310), the backup manager (310) may perform all, or a portion, of the methods illustrated in FIG. 6.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the functionality of the backup manager (310) is provided by special purpose hardware devices. For example, the backup manager (310) may be implemented as computing code stored on a persistent storage that when executed by a processor performs the functionality of the backup manager (310). When executing the computing code stored on the persistent storage, the processor may invoke functionality of one or more special purpose hardware devices that gives rise to a portion of the functionality off the backup manager (310). The special purpose hardware device may be, for example, a programmable gate array, application specific integrated circuit, digital signal process, or other type of hardware device operably connected to the processor.

In one or more embodiments of the invention, the persistent storage (320) provides data storage services to the backup manager (310) and/or other entities. The data storage services may include storing of data and providing of previously stored data. The persistent storage (320) may store data structures including the containerized repository (322), the deduplicated backups (324), and the data map (326). The persistent storage (320) may be a physical storage device or a logical storage device.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, and/or memory for providing cache services for the hardware devices, etc.

While the example backup storage (300) of FIG. 3 has been described and illustrated as including a limited number of components for the sake of brevity, a backup storage in accordance with embodiments of the invention may include additional, fewer, and/or different components than those illustrated in FIG. 3 without departing from the invention.

Figure 4:
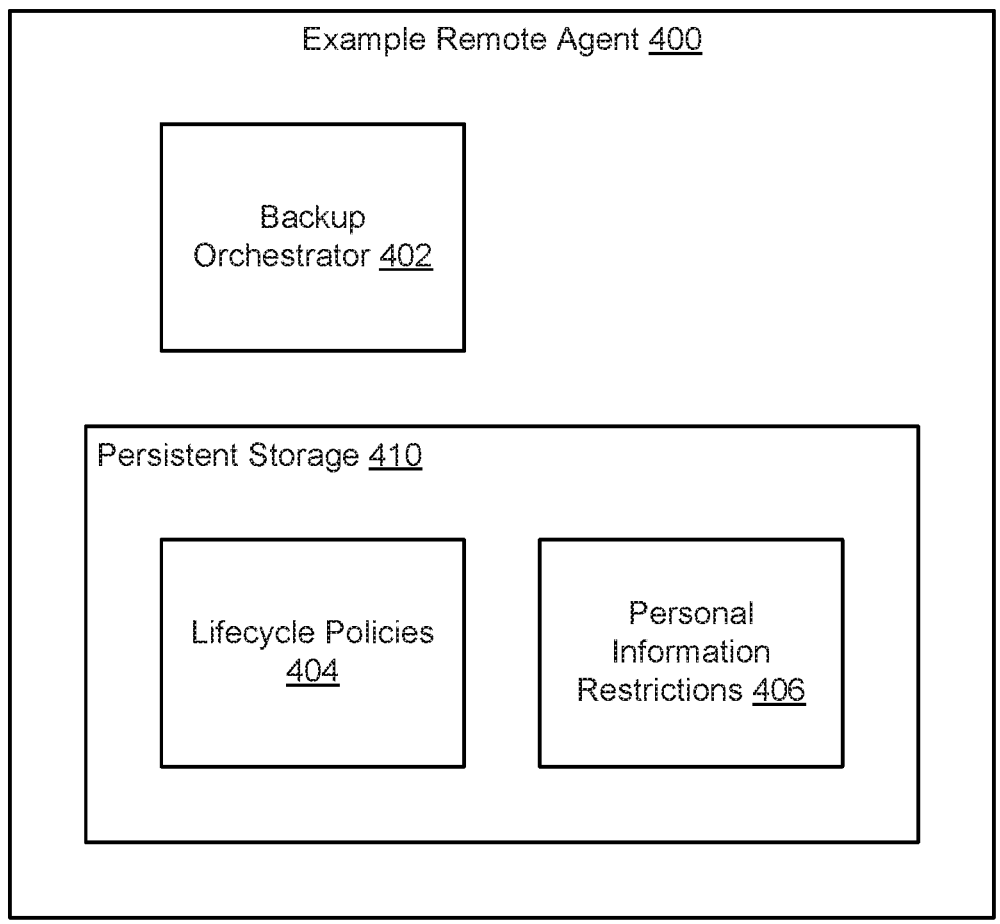
FIG. 4 shows a diagram of an example remote agent in accordance with one or more embodiments of the invention.

As discussed above, remote agents may provide data protection services to clients. FIG. 4 shows a diagram of an example remote agent (400) in accordance with one or more embodiments of the invention. The example remote agent (400) may be similar to any of the remote agents (110, FIG. 1). As discussed above, the example remote agent (400) may provide data protection services for clients (e.g., 130, FIG. 1).

To provide the aforementioned functionality of the example remote agent (400), the example remote agent (400) may include a backup orchestrator (402) and persistent storage (410). Each component of the example remote agent (400) is discussed below.

The backup orchestrator (402) may provide data protection services by (i) orchestrating the generation and storage of backups in backup storages and (ii) maintain the lifecycle policies (404) in accordance with personal information restrictions (406). By doing so, the backup orchestrator (402) may provide data protection services while complying with restrictions on the users of personal information.

To orchestrate the generation and storage of backups in backup storages, the backup orchestrator (402) may instantiate a backup agent in the client, generate backups for the example client using the backup agent in accordance with the lifecycle policies (404), store the backup in backup storages in accordance with the lifecycle policies (404), and may maintain the stored backup in the backup storages in accordance with the lifecycle policies (404).

To maintain the lifecycle policies (404), the backup orchestrator (402) may identify limitations on the use of personal information of one or more persons and update the lifecycle policies (404) to comply with those restrictions.

Figure 8:
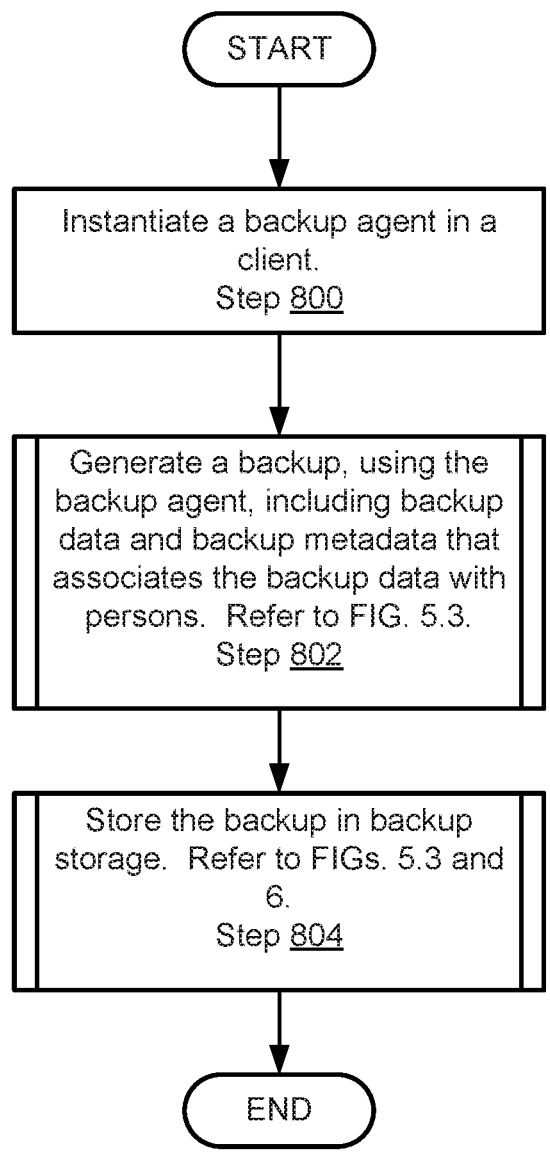
FIG. 8 shows a flowchart of a method of providing data protection services in accordance with one or more embodiments of the invention.

To provide all, or a portion, of the above noted functionality of the backup orchestrator (402), the backup orchestrator (402) may perform all, or a portion, of the methods illustrated in FIG. 8.

In one or more embodiments of the invention, the backup orchestrator (402) is a hardware device including circuitry. The backup orchestrator (402) may be, for example, a digital signal processor, a field programmable gate array, or an application specific integrated circuit. The backup orchestrator (402) may be other types of hardware devices without departing from the invention.

In one or more embodiments of the invention, the backup orchestrator (402) is implemented as computing code stored on a persistent storage that when executed by a processor performs the functionality of the backup orchestrator (402). The processor may be a hardware processor including circuitry such as, for example, a central processing unit or a microcontroller. The processor may be other types of hardware devices for processing digital information without departing from the invention.

In one or more embodiments of the invention, the functionality of the backup orchestrator (402) is provided by special purpose hardware devices. For example, the backup orchestrator (402) may be implemented as computing code stored on a persistent storage that when executed by a processor performs the functionality of the backup orchestrator (402). When executing the computing code stored on the persistent storage, the processor may invoke functionality of one or more special purpose hardware devices that gives rise to a portion of the functionality of the backup orchestrator (402). The special purpose hardware device may be, for example, a programmable gate array, application specific integrated circuit, digital signal process, or another type of hardware device operably connected to the processor.

In one or more embodiments of the invention, the persistent storage (410) provides data storage services to the backup orchestrator (402) and/or other entities. The data storage services may include storing of data and providing of previously stored data. The persistent storage (410) may be a physical storage device or a logical storage device.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

While the example remote agent (400) of FIG. 4 has been described and illustrated as including a limited number of components for the sake of brevity, a backup storage in accordance with embodiments of the invention may include additional, fewer, and/or different components than those illustrated in FIG. 4 without departing from the invention.

The persistent storage (410) may store data structures including the lifecycle policies (404) and personal information restrictions (406). Each of these data structures is discussed below.

The lifecycle policies (404) may be data structures that specify how data protection services are to be provided for different clients and/or different portions of the client's data. For example, a lifecycle policy of the lifecycle policies (404) may specify when backups for a portion of client data is to be generated, where the generated backup is to be stored, when a backup in backup storage is to be transitioned to another storage location (e.g., another backup storage), and/or other characteristics of a data protection strategy for a corresponding client. The lifecycle policies (404) may include any number of lifecycle policies. Each of the lifecycle policies may be for any quantity of clients and/or portions of client data. Thus, the lifecycle policies (404) may define data protection strategies at a granular or macro level.

The personal information restrictions (406) may be a data structure that specifies restrictions on the use of personal information of persons. The personal information restrictions (406) may specify under what conditions personal information associated with a person may be utilized. For example, the personal information restrictions (406) may specify where (e.g., a geographical region) personal information may be stored, how long the personal information may be kept, etc.

To maintain the lifecycle policies (404) in accordance with the personal information restrictions (406), the backup orchestrator (402) may modify the lifecycle policies (404) to meet the requirements of each person for which the personal information restrictions (406) includes a restriction.

For example, consider a scenario in which the personal information restrictions (406) specify that information associated with a person named Aly may not be stored outside of the European Union. To maintain the lifecycle policies (404), the backup orchestrator (402) may modify a storage location for a backup that includes Aly's personal information so that the backup is initially stored in a backup storage located within the European Union and that the backup is transitioned only to other backup storages located within the European Union.

In another example, consider a scenario in which the personal information restrictions (406) specify that information associated with a person named Aly may not be stored. To maintain the lifecycle policies (404), the backup orchestrator (402) may modify a storage policy to exclude Aly's personal information from backups generated based on the lifecycle policy.

In a still further example, consider a scenario in which a backup is generated that includes Aly's personal information. After generating and storing the backup in a backup storage, the personal information restrictions (406) may be modified to specify that Aly's personal information may not be stored. To maintain the lifecycle policies (404), the backup orchestrator (402) may modify a storage policy associated with the backup to reduce a retention time for the backup so that the backup is not retained. Consequently, the backup that includes Aly's personal information may be eliminated from the backup storage and thereby cause the backups in backup storage to comply with the personal information restrictions (406).

Thus, by maintaining the lifecycle policies (404), the backup orchestrator (402) may prevent backups from being store/maintained that violate the personal information restrictions (406).

While the data structures (e.g., 404, 406) of FIG. 4 are illustrated as separate data structures and have been discussed as including a limited amount of specific information, any of the aforementioned data structures may be divided into any number of data structures, combined with any number of other data structures, and may include additional, less, and/or different information without departing from the invention. Additionally, while illustrated as being stored in the persistent storage (410), any of the aforementioned data structures may be stored in different locations (e.g., in persistent storage of other computing devices) and/or spanned across any number of computing devices (e.g., across the example remote agent (400) and any number of other computing devices, across any number of other computing devices, etc.) without departing from the invention.

While the example remote agent (400) of FIG. 4 has been described and illustrated as including a limited number of components for the sake of brevity, a remote agent in accordance with embodiments of the invention may include additional, fewer, and/or different components than those illustrated in FIG. 4 without departing from the invention.

Returning to FIG. 1, the clients (130) may participate in the performance of protection services orchestrated by the remote agents (110). For example, the remote agents (110) may request that the clients (130) generate backups at predetermined points in time to comply with the requirements of lifecycle policies. By doing so, the remote agents (110) may invoke predetermined functionality of the clients (130). FIGS. 5.1-53 illustrate methods that may be performed by the clients (130) of the system of FIG. 1 when participating in data protection services.

FIG. 5.1 shows a flowchart of a method in accordance with one or more embodiments of the invention. The method depicted in FIG. 5.1 may be used to update data tags in accordance with one or more embodiments of the invention. The method shown in FIG. 5.1 may be performed by, for example, clients (e.g., 130, FIG. 1). Other components of the system illustrated in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, data implicated by a backup generation is identified.

In one or more embodiments of the invention, the data implicated by the backup generation may be all, or a portion, of the data of the client. Backups may be generated at a granular level or macro-level. For example, the granular backup may only include backup data for a particular application hosted by a client. In contrast, a macro-level backup may include backup data for all of the data of the client. Thus, the data implicated by the backup generation may be identified based on a type of backup that is to be generated as part of the backup generation. In other words, only the data of those entities for which the backup is being generated may be implicated by the backup generation.

In one or more embodiments of the invention, the backup generation is initiated by a remote agent. The remote agent may send a request to a client to initiate the backup generation. As part of the request, the remote agent may specify for which entities of the client the backup generation is to generate a backup. Based on the information included in the request, the data implicated by the backup generation may be identified.

In step 502, a portion of the data is identified.

In one or more embodiments of the invention, the portion of the data is any identifiable portion of the data. For example, the portion of the data may be a file, the database, or any other type of portion of the data that is recognizable as being separate from the remaining data.

In step 504, metadata for the portion of the data is initialized.

As discussed with respect to FIG. 2.1, data tags metadata (222) may be generated as part of the process of updating data tags (216). The data tags metadata (222) may be a data structure used to temporarily store information regarding personal information that may be included in the portion of the data. The metadata initialized here may be similar to the data tags metadata (222).

In one or more embodiments of the invention, the metadata is initialized by instantiating a data structure for the metadata in memory. For example, a portion of the memory of the client may be reserved for the metadata.

In step 506, the metadata is updated based on privacy policies.

As discussed with respect to FIG. 2.1, the privacy policies (218) may include information regarding portions of the data that are likely to include personal information, confidential information, or other information that may need a higher level of scrutiny for control and/or management.

In one or more embodiments of the invention, the privacy policies are used to classify the portion of the data as (i) likely to include personal information, (ii) likely to include confidential information, and/or (iii) like to include information that needs a higher level of scrutiny. The metadata may be updated to reflect the aforementioned classification.

For example, the privacy policies may include a list of rules for classifying the portion of the data. If a rule indicates any of (i)-(iii), then the metadata may be classified with information corresponding to the rule.

In one or more embodiments of the invention, the metadata is updated by adding information reflecting whether the portion of the data as (i) likely to include personal information, (ii) likely to include confidential information, and/or (iii) like to include information that needs a higher level of scrutiny. Any type and/or quantity of data may be added to the metadata to reflect the status of the portion of the data. For example, an identifier indicating that the portion of the data is likely to include personal information may be added to the metadata to update the metadata.

While described above as adding information to the metadata, the metadata may be updated by modifying and/or removing information from the metadata to reflect a status of the portion of the data without departing from the invention.

In step 508, the metadata is updated based on the confidentiality of the portion of the data.

In one or more embodiments of the invention, the confidentiality of the portion of the data is identified based on the contents of the portion of the data. For example, if the portion of the data is confidential, the portion of the data may include a description of its confidentiality status within the portion of the data.

In one or more embodiments of the invention, the confidentiality of the portion of the data is identified based on system metadata associated with the portion of the data. For example, system metadata may specify characteristics of the portion of the data. The characteristics of the portion of the data specified by the system metadata may indicate the confidential status of the portion of the data.

In one or more embodiments of the invention, the metadata is updated based on the confidentiality of the portion of the data by adding information to the metadata, modifying information included in the metadata, and/or removing information from the metadata. For example, an indicator of the portion of the data may be added to the metadata. In another example, an existing indicator included in the metadata regarding the confidentiality status of the portions of the data may be modified to match the confidentiality status of the portion of the data. In a still further example, information indicating that the portion of the data is confidential may be removed to match the confidentiality status of the portion of the data.

In step 510, the metadata is updated based on system metadata associated with the portion of the data.

In one or more embodiments of the invention, the metadata is updated based on the system metadata associated with the portion of the data to indicate whether the portion of the data includes personal information. If the portion of the data includes personal information, information reflecting the personal information included in the portion of the data may be added to the metadata.

For example, the name of the person associated with the personal information may be included in the metadata. Additionally, access information for the personal information may be added to the metadata. The access information may be, for example, offsets or other information that may be used to access the sub-portion of the portion of the data that includes the personal information.

In one or more embodiments of the invention, the metadata is updated based on the system metadata associated with the portion of the data by identifying one or more persons that own, use, maintain, and/or frequently access the portion of the data. Such information may be included in the system metadata.

If the system metadata indicates that a particular person created the portion of the data, the metadata may be updated to indicate that the particular person likely has personal information included in the portion of the data.

If the system metadata indicates that a particular person frequently accesses the portion of the data, the metadata may be updated to indicate that the particular person likely has personal information included in the portion of the data.

If the system metadata indicates that a particular person owns the portion of the data (i.e., has access rights), the metadata may be updated to indicate that the particular person likely has personal information included in the portion of the data.

If the system metadata indicates that a particular person maintains the portion of the data (i.e., an author), the metadata may be updated to indicate that the particular person likely has personal information included in the portion of the data.

In step 512, the metadata is updated based on availability status of the portion of the data.

In one or more embodiments of the invention, the availability status of the portion of the data is determined based on whether the portion of the data is publicly accessible. For example, the portion of the data may be publicly accessible if multiple users are allowed to access the portion of the data. In another example, the portion of the data may be publicly accessible if the portion of the data is located in a remotely accessible storage location.

If it is determined that the portion of the data is publicly accessible, the availability status of the portion of the data may be determined as being publicly accessible. In a scenario in which it is determined that the portion of the data is publicly accessible, the metadata may be modified by adding, removing, or changing portions of the metadata to reflect the availability status of the portion of the data.

In step 514, it is determined whether a portion of the data is an aggregate data structure.

In one or more embodiments of the invention, the determination is made by matching the type of the portion of the data to a list of types of data structures that are aggregate data structures. For example, the list may specify that databases, archives, and/or other types of data structures that are likely to include multiple sub portions of data are aggregate data structures. If the type of the portion of the data matches one of the types of data structures listed in the list, the portion of the data may be identified as an aggregate data structure.

If the portion of the data is determined to be an aggregate data structure, the method may proceed to step 520 in FIG. 5.2. If the portion of the data is determined to not be an aggregate data structure, the method may proceed to step 516.

In step 516, the metadata is updated based on person associations embedded in the portion of the data.

In one or more embodiments of the invention, the person associations embedded in the portion of the data are determined by identifying personal information included in the portion of the data. For example, the portion of the data may include any number of sub-portions that each includes personal information.

In one or more embodiments of the invention, the personal information included in the portion of the data is identified by performing data mining on the portion of the data. Data mining the portion of the data may be performed by keyword searching the contents of the portion of the data for strings that indicate that a sub-portion of the portion of the data includes personal information.

For example, a keyword list may be maintained. Each of the keywords in the keyword list may indicate that a sub-portion of the portion of the data that includes the respective key word includes personal information. The portion of the data may be searched by sub-dividing the portion of the data into any number of sub-portions. The division may be made based on logical divisions within the portion of the data. Each of the sub-portions may be searched based on all, or a portion, of the key words included in the keyword list. If a searched sub-portion is matched to any of the keywords, the sub-portion may be identified as including personal information. A personal association may be generated based on the match.

For example, the person association may be a relationship between a sub-portion of the data and a likely inclusion of personal information within the sub-portion of the data.

To update the metadata based on a person association embedded in the portion of the data, the metadata may be updated to reflect (i) that the person association exists, (ii) indicate a type of the person association, (iii) if identifiable, an indicator of the person implicated by the person association, and/or (iv) access information for the sub-portion of the portion of the data that likely includes the person association. To reflect the person association, the metadata may be modified by adding, modifying, and/or removing information from the metadata.

In one or more embodiments of the invention, a keyword list that may be used to search for person associations includes any number of strings. Each of the strings may be heuristically determined as likely to, when used as a basis for searching, identify personal information included in data. The strings may include, for example, "name", "salary", "address", "email", "phone", "number", "contact", "telephone", "social media", etc.

While the data mining of the portion of the data has been described as being performed via string searching, other methods for data mining the portion of the data to identify person associations may be used without departing from the invention.

For example, a machine learning model may be appropriately trained to identify patterns within the portion of data. Once trained, the machine learning model may be used to perform the identification.

In another example, heuristically determined rules may be used to identify the person associations.

In step 518, data tags are updated based on the metadata.

In one or more embodiments of the invention, the data tags are updated by adding new data tags to the data tags to reflect updates to the metadata made in steps 506, 508, 510, 512, and/or 516. A new data tag may be added by generating a data tag data structure and populating the new data tag with a portion of the information included in the metadata.

For example, if the metadata has been updated to indicate that a sub-portion of the portion of the data includes personal information, a new data tag data structure may be generated. Once generated, identification and/or access information for the sub-portion of the data may be added to the new data tag data structure. Additionally, an indication of the type of personal information may be added to the new data tag data structure. Other types of information included in the metadata for the sub-portion of the data may be added to the new data tag data structure without departing from the invention.

In one or more embodiments of the invention, the data tags are updated by modifying existing data tags to reflect updates to the metadata made in steps 506, 508, 510, 512, and/or 516. The data tags may be modified by changing the contents of data tag data structures.

In one or more embodiments of the invention, the data tags are updated by removing existing data tags to reflect updates to the metadata made in steps 506, 508, 510, 512, and/or 516. The data tags may be removed by deleting data tag data structures.

The method may end following step 518.

Returning to step 514, the method may proceed to step 520 illustrated in FIG. 5.2 following step 514 if the portion of the data is an aggregate data structure.

FIG. 5.2 shows a continuation of the flowchart of FIG. 5.1.

In step 520, sub-portions of the portions of the data are identified.

In one or more embodiments of the invention, the sub-portions of the portion of the data are the smallest addressable data units of the portion of the data.

For example, if the portion of the data is a database, the sub-portions of the portion of the data may be an entry in the database, i.e., data that may be accessed using keys to the database.

In step 522, the metadata is updated based on person associations embedded in the sub-portions of the portions of the data.

The person associations embedded in the sub-portions of the portions of the data may be identified similarly to Step 516 of FIG. 5.1. The metadata may be updated similarly to Step 516 of FIG. 5.1 but on a sub-portion of a sub-portion of the portion of the data basis.

In Step 524, the data tags are updated based on the metadata. The metadata may be updated similarly to Step 518 of FIG. 5.1 but on a sub-sub-portion of the portion of the data basis.

The method may end following Step 524.

As discussed above, clients may participate in data protection services while remote agents orchestrate the data protection services. As part of orchestrating the data protection services, the remote agents may request that clients generate backups. FIG. 5.3 shows a method that may be performed by clients when participating in data protection services. mp FIG. 5.3 shows a flowchart of a method in accordance with one or more embodiments of the invention. The method depicted in FIG. 5.3 may be used to generate a backup in accordance with one or more embodiments of the invention. The method shown in FIG. 5.3 may be performed by, for example, clients (e.g., 130, FIG. 1). Other components of the system illustrated in FIG. 1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 540, data tags for an entity are updated.

In one or more embodiments of the invention, the data tags for the entity may be updated by adding new data tags, modifying existing data tags, and/or deleting data tags.

In one or more embodiments of the invention, the data tags for the entity are updated via the method illustrated in FIG. 5.1. The data tags for the entity may be updated via other methods without departing from the invention.

In one or more embodiments of the invention, the data tags for the entity are updated periodically. For example, the data tags may be updated on a schedule.

In one or more embodiments of the invention, the data tags for the entity are updated in response to predetermined events. For example, the data tags may be updated in response to changes to data of the entity.

In step 542, backup data for the entity is generated.

In one or more embodiments of the invention, the backup data for the entity is generated based on the data of the entity. For example, the backup data may be information used to restore all, or a portion, the data of the entity.

The backup data may be generated via any method without departing from the invention.

In step 544, backup metadata is generated based on the portion of the data tags that are associated with the backup data.

In one or more embodiments of the invention, the backup metadata is generated based on the contents of the portion of the tags that are associated with the backup data. The generated backup metadata may reflect personal information included in the backup data. The backup metadata may specify any personal information included in the backup data. The backup metadata may include access information for the personal information included in the backup data.

In step 546, the backup data and the backup metadata are aggregated to obtain the backup.

For example, a backup similar to that illustrated FIG. 2.3 may be generated.

The generated backup may be sent to backup storage.

The method may end following step 546.

Returning to FIG. 1, backup storages may store backups. For example, when a backup is generated via the method illustrated in FIG. 5.3, the generated backup may be sent to a backup storage for storage in accordance with lifecycle policies. FIG. 6 shows a method that may be used when storing a backup.

FIG. 6 shows a flowchart of a method in accordance with one or more embodiments of the invention. The method depicted in FIG. 6 may be used to store a backup in accordance with one or more embodiments of the invention. The method shown in FIG. 6 may be performed by, for example, backup storages (e.g., 120, FIG. 1). Other components of the system illustrated in FIG. 1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, a backup is obtained.

In one or more embodiments of the invention, the backup is obtained from a client. For example, the client may generate the backup and provide the backup to a backup storage.

In one or more embodiments of the invention, the backup is obtained from an entity other than a client. For example, as described with respect to FIG. 1, the system of FIG. 1 may include additional components from those illustrated in the figure. The backup may be obtained from any other type of entity. The backup may have been generated by the any other type of entity or another entity such as a client. For example, the client may provide the backup to the another entity and the another entity may provide the backup to the backup storage.

In step 602, the backup data portions of the backups are deduplicated.

As described with respect to FIG. 2.3, a backup may include any number of backup data portions that include information that may be used to perform restorations. Each of the backup data portions may include any quantity of data. To deduplicate the backup data portions, only the sub-portions of the backup data portions that include data that is not duplicative of data already stored in the backup storage may be elected for storage.

In one or more embodiments of the invention, a backup data portion is deduplicated by dividing the backup data portion into any number of segments. A segment may be a sub-portion of the backup data portion. It may be determined, for each of the segments, whether each of the segments includes data that is duplicative of data already stored in the backup storage. Only those segments that do not include duplicative data may be elected for storage.

In one or more embodiments of the invention, hashes of segments are compared to hashes of segments already stored in the backup storage to determine whether a segment include duplicative data.

In step 604, the deduplicated backup data portions of the backup are stored in a containerized repository.

In one or more embodiments of the invention, the deduplicated backup data portions of the backup are stored by only storing the segments of the data portions that do not contain duplicative of data.

In one or more embodiments of the invention, the segments of the data portions that do not contain duplicative data are stored in one or more containers of the containerized repository. A container may be a data structure for storing data. The container may be the smallest size addressable data unit of the containerized repository. In other words, storing the deduplicated backup data portions may cause the deduplicated backup data portions to be in a format that does not allow for searching or indexing because of the lack of metadata or other structural descriptions of the data stored in the containerized repository.

For example, any number of segments may be stored in a container and the container/containerized repository may not include a description of the layout of the segments within the container. Consequently, the segments may not be addressable using information provided by the containerized repository.

In step 606, a data map of the containerized repository is updated using person associations of the backup.

As discussed above, the backup may include metadata portions corresponding to each of the data portions. The metadata portions include person associations for each of the data portions.

The data map of the containerized repository may be a data structure that associates different portions of backup data stored in the containerized repository that include personal information. The data map may be updated by modifying the data map to reflect information included in the metadata portions of the backup. By doing so, it may be possible to determine whether any portion of backup data in the containerized repository includes personal information. Additional information regarding the personal information may be obtained from the data map such as, for example, access information for each portion of the backup data that includes personal information, the type of personal information included in each portion of the backup data, etc.

The method may end following step 606.

Thus, via the method illustrated in step 606, embodiments of the invention may provide a method for storing a backup in backup storage that enables personal information within the stored backups to be efficiently identified while reducing a storage footprint size of the data map.

As discussed above, backup storages may store data maps of data stored in containerized repository. The data maps may enable information regarding personal information included in the backup storages to be efficiently identified. FIG. 6 shows a method that may be used when it is necessary to identify personal information included in a containerized repository.

Figure 7:
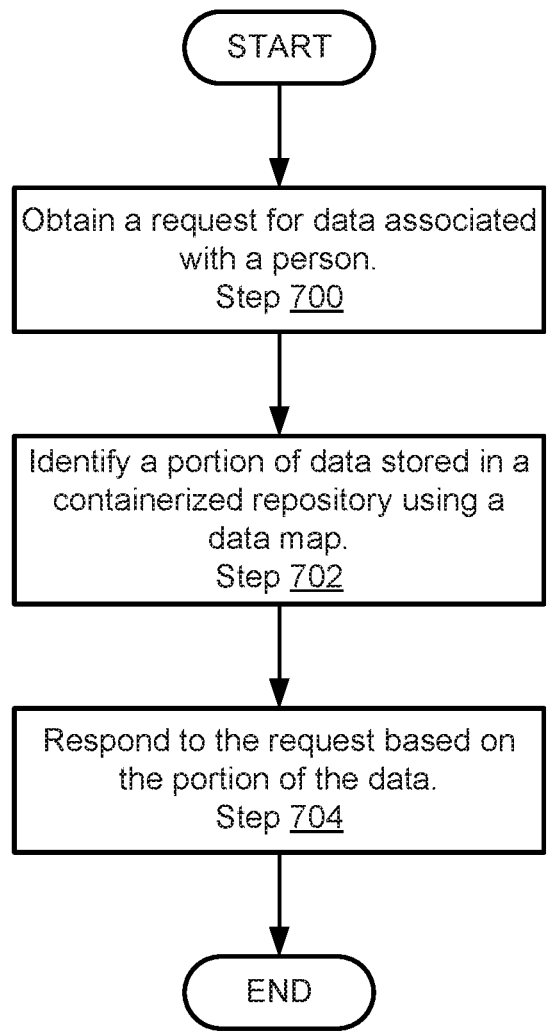
FIG. 7 shows a flowchart of a method of responding to a personal information request in accordance with one or more embodiments of the invention.

FIG. 7 shows a flowchart of a method in accordance with one or more embodiments of the invention. The method depicted in FIG. 7 may be used to respond to a request for personal information in accordance with one or more embodiments of the invention. The method shown in FIG. 7 may be performed by, for example, backup storages (e.g., 120, FIG. 1). Other components of the system illustrated in FIG. 1 may perform all, or a portion, of the method of FIG. 7 without departing from the invention.

While FIG. 7 is illustrated as a series of steps, any of the steps may be omitted, performed in a different order, additional steps may be included, and/or any or all of the steps may be performed in a parallel and/or partially overlapping manner without departing from the invention.

In step 700, a request for data associated with the person is obtained.

In one or more embodiments of the invention, the request for data associated with the person may be obtained from a remote agent or another management entity. For example, the information may be obtained from a remote agent tasked with ensuring that data stored in backup storages is in compliance with rules regarding the use of personal information.

In step 702, a portion of data stored in a containerized repository is identified using the data map.

In one or more embodiments of the invention, the portion of data stored in the containerized repository is identified by using an identity of the person as a key to search the data map. If information regarding the person is included in the containerized repository, the data map may include a description of such information keyed to an identity of the person.

In step 704, the request is responded to based on the portion of the data.

In one or more embodiments of the invention, the request is responded to by sending a notification to a requesting entity that indicates that personal information associated with the person that is included in the containerized repository.

In one or more embodiments of the invention, the request is responded to by sending a message to a requesting entity that indicates the contents of the personal information associated with the person that is included in the containerized repository.

The request may be responded to based on the portion of the data via other methods without departing from the invention. For example, a response to the request may be based on multiple portions of data stored in the containerized repository that each includes similar and/or different personal information associated with the person.

The method may end following step 704.

Thus, via the method illustrated in FIG. 7, embodiments of the invention may provide a method for determining whether personal information is stored in a containerized repository without utilizing information included in the containerized repository. For example, data within the containerized repository need not be directly searched or otherwise manipulated. By doing so, the computational cost for searching data stored in a backup storage may be reduced.

Returning to FIG. 1, remote agents (110) may orchestrate the generation of backups and/or storage of backups of clients (130) and/or other entities. FIG. 8 shows a method that may be used when the remote agents (110) orchestrate such actions.

FIG. 8 shows a flowchart of a method in accordance with one or more embodiments of the invention. The method depicted in FIG. 8 may be used to respond to a request for personal information in accordance with one or more embodiments of the invention. The method shown in FIG. 8 may be performed by, for example, remote agents (e.g., 110, FIG. 1). Other components of the system illustrated in FIG. 1 may perform all, or a portion, of the method of FIG. 8 without departing from the invention.

While FIG. 8 is illustrated as a series of steps, any of the steps may be omitted, performed in a different order, additional steps may be included, and/or any or all of the steps may be performed in a parallel and/or partially overlapping manner without departing from the invention.

In step 800, a backup agent is instantiated in a client.

In one or more embodiments of the invention, the backup agent is instantiated when the remote agent determines that the remote agent is to provide data protection services for the client.

In one or more embodiments of the invention, the backup agent is instantiated when the remote agent determines that a backup for the client is to be generated.

In one or more embodiments of the invention, the backup agent instantiates the remote agent by sending a request to the client to instantiate the remote agent. The remote agent may be instantiated by an initiating execution of computer instructions, e.g., computer code, that cause processor to provide the functionality of the backup agent.

In one or more embodiments of the invention, the computer instructions for the remote agent may be obtained by the client in response to the request to instantiate the remote agent. The computer instructions may be stored in any location without departing from the invention. For example, the computer instructions may be stored locally on the client or remotely in another entity. In another example, the remote agent may provide instructions for the backup agent to the client.

In step 802, a backup that includes backup data and backup metadata that associates the backup data with persons is generated using the backup agent.

In one or more embodiments of the invention, the backup is generated by invoking functionality of the backup agent for generating the backup. When the functionality of the backup agent is invoked, the backup agent may perform all, or a portion, of the method illustrated in FIG. 5.3.

In step 804, the backup is stored in backup storage.

In one or more embodiments of the invention, the backup is stored in backup storage by invoking functionality of the backup agent. When the functionality of the backup agent is invoked, the backup agent may perform all, or a portion, of the method illustrated in FIG. 5.3.

For example, after the backup agent generates the backup, the backup agent may store the backup in a backup specified by the remote agent. The remote agent may specify the storage location(s), level of redundancy, and/or other information regarding the process of storing the backup in backup storage when invoking the functionality of the backup agent. To do so, the remote agent may send a message to a client hosting the backup agent that, when received by the client, invokes the functionality of the backup agent.

When the backup is stored in the backup storage, the backup storage may perform all, or a portion, of the method illustrated in FIG. 6.

The method may end following Step 804.

Thus, via the method illustrated in FIG. 8, embodiments of the invention may provide a method for orchestrating the generation and storage of backups in backup storage.

When orchestrating the generation and storage of backups, the remote agents may send requests to other entities (e.g., clients, backup storages). The entities may be programmed to take predetermined action in response to these requests.

For example, the requests may include identifiers of predetermined action to be performed by the entities. The identifiers may correspond to functionality of the backup agents hosted by the entities.

In another example, the requests may include computer instructions that, when executed by one or more processors of the entities, cause the entities to perform predetermined action. The entities may be programmed to execute the computer instructions which, consequently, cause the entities to perform the predetermined action.

The predetermined actions may be any of the actions described with respect to FIG. 8.

The method illustrated in FIG. 8 may be performed to meet the requirements of lifecycle policies. As noted above, life cycle policies may specify data protection strategies for entities of the system of FIG. 1. A data protection strategy may specify when, how, and where backups are to be generated and stored. To meet the requirements of the data protection strategies, the remote agents (110) of FIG. 1 may perform the method illustrated in FIG. 8 at any point in time. Further, multiple instances of the method illustrated in FIG.

8 may be performed in a parallel or partially overlapping manner for any number of entities.

To further clarify embodiments of the invention, a non-limiting example is provided in FIGS. 9.1-9.4. Each of these figures may illustrate a system similar to that illustrated in FIG. 1 at different points in times. For the sake of brevity, only a limited number of components of the system of FIG. 1 are illustrated in each of FIGS. 9.1-9.4.

EXAMPLE

Consider a scenario as illustrated in FIG. 9.1 in which a remote agent (not shown) has been tasked with providing data protection services for client (900). The client (900) hosts a database application (902) that will store data in a persistent storage (910). The database application (902) will provide database services to a user named Fred that will store information relating to their business using the database service.

To provide data protection services to the client (900), the remote agent instantiates a backup agent (904) in the client (900) as illustrated in FIG. 9.2. After instantiating the backup agent (904), Fred's employee Tom begins to utilize the services provided by the database application (902) by storing sales information using the database application (902). By doing so, data that is relevant to the user is stored in application data (912) of the database application (902) as illustrated in FIG. 9.3. Additionally, the client (900) generates system metadata (913) associated with Fred and Tom's use of the database application (902).

For example, the application data (912) includes indicating that a sale of 10 tons of wheat was made to a customer named Martha. The application data (912) also includes data indicating that Martha may be contacted at the email address martha@wheat. corn.

The system metadata (913) includes data indicating that Fred is the owner of the data included in the application data (912) and that Tom is a frequent accessor and maintainer of the application data (912).

After the aforementioned information was stored in the persistent storage (910) of the client (900), the remote agent (not shown) sends a request to the clients (900) to generate and store a backup in backup storage. In response to receiving the aforementioned request, the clients (900) invoke functionality of the backup agent (904) that causes a backup (914) to be generated as illustrated in FIG. 9.4.

The backup (914) includes a backup data portion (916) and a backup metadata (918). The backup data portion (916) includes information regarding the application data that may be used to restore the application data (912) at a future point in time.

The backup metadata (918) includes information regarding the likely inclusion of personal information in the backup data portion (916). Specifically, the metadata portion includes a first entry in the list indicating that Fred has an interest in the backup data portion (916). The backup agent (904) generated the first entry because the system metadata indicates that Fred is an owner of the application data (912).

The backup metadata (918) also includes a second entry in the list indicating that Tom has an interest in the backup data portion (916). The backup agent (904) generated the second entry because the system metadata (913) indicates that Tom is frequent user of the application data (912).

The backup metadata (918) further includes a third entry in the list indicating that Martha has personal information in the second element of the backup data portion (916). The backup agent (904) generated the third entry because the application data (912) includes Martha's name in its second element.

The backup metadata (918) additionally includes a fourth entry in the list indicating that Martha has personal information in the third element of the backup data portion (916). The backup agent (904) generated the fourth entry because the application data (912) includes Martha's contact information in its third element.

After generating the backup (914), the backup agent (904) provides a copy of the backup (914) to a backup storage specified by the remote agent. By doing so, a copy of data that may be used to restore the application data (912) at a future point in time may be redundantly stored in the backup storage for data protection purposes.

End of Example

Figure 10:
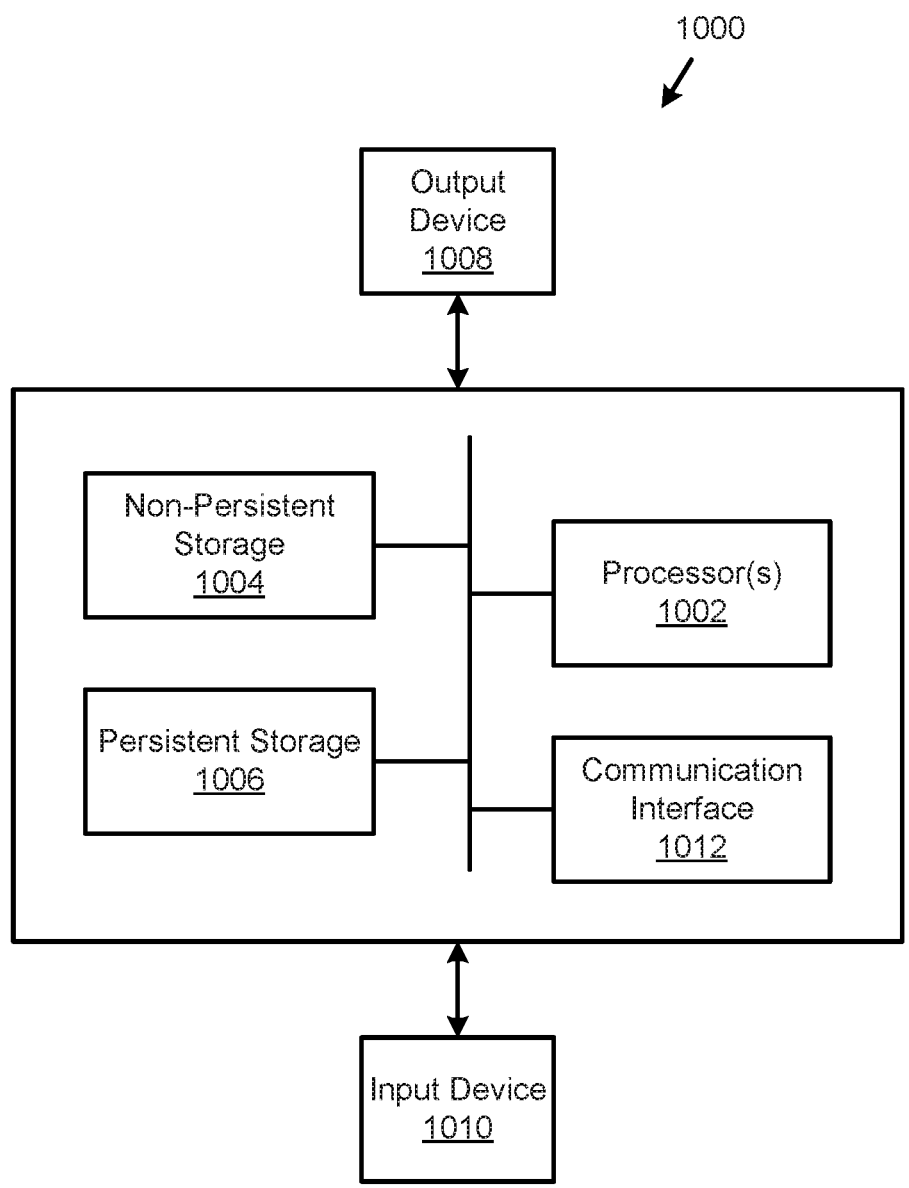
FIG. 10 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 10 shows a diagram of a computing device in accordance with one or more embodiments of the invention. The computing device (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), input devices (1010), output devices (1008), and numerous other elements (not shown) and functionalities. Each of these components is described below.

In one embodiment of the invention, the computer processor(s) (1002) may be an integrated circuit for processing instructions. For example, the computer processor(s) may be one or more cores or micro-cores of a processor. The computing device (1000) may also include one or more input devices (1010), such as a touchscreen, keyboard, mouse, microphone, touchpad, electronic pen, or any other type of input device. Further, the communication interface (1012) may include an integrated circuit for connecting the computing device (1000) to a network (not shown) (e.g., a local area network (LAN), a wide area network (WAN) such as the Internet, mobile network, or any other type of network) and/or to another device, such as another computing device.

In one embodiment of the invention, the computing device (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing devices exist, and the aforementioned input and output device(s) may take other forms.

Embodiments of the invention may provide methods for identifying personal information that may be stored in backups. The method may do so by including backup data metadata that reflects the included personal information in the backups. By doing so, a backup storage may efficiently search for personal information associated with different persons without crawling or otherwise indexing or searching the backups, which may be computationally expensive process due to a storage format of the backups that reduces the storage footprint of the backups.

Thus, embodiments of the invention may address the problem of the limited availability of computational resources in a distributed system that relies on data redundancy for data protection purposes. Specifically, embodiments of the invention may provide a method of distributing the computational load for identifying personal information in backups away from the backup storage. By doing so, the backups may be stored in a storage space efficient format while still providing computationally efficient personal information search capabilities.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for providing data protection services to clients, comprising:
persistent storage for storing:
lifecycle policies that specify when backups of the clients are to be generated; and
privacy policies that specify a classification system for data of the clients which discriminates portions of the data of the clients that comprise personal information from other portions of the data of the clients that do not comprise personal information;
a backup orchestrator programmed to:
instantiate a backup agent in a client of the clients in response to a backup generation for the client, wherein the backup generation is specified by the lifecycle policies; and
using the backup agent:
generate a backup using the privacy policies comprising:
backup data for the client,
data tags for the client, and
backup metadata that associates portions of the backup data with respective persons; and
store the backup in backup storage based on the lifecycle policies,
wherein generating data tags for the client comprises:
for a first portion of client data of the client:
identifying that the first portion of the client data includes personal information of a person of the persons based on the privacy policies;
generating a first data tag of the data tags comprising information indicating that the first portion of the client data is confidential, wherein the first data tag further comprises a first data portion identifier identifying the first portion of the client data and person association information including the personal information of the person of the persons;
for a second portion of client data of the client:
identifying that the second portion of the client data does not include the personal information of the person of the persons based on the privacy policies; and
generating a second data tag of the data tags comprising information indicating a confidentiality status of the second portion of the client data that does not include the personal information of the person of the persons, wherein the second data tag further comprises a second data portion identifier identifying the second portion of the client data and the person association information including the personal information of the person of the persons.

2. The remote agent of claim 1, wherein generating the backup using the privacy policies comprises:
generating the backup data;
generating the backup metadata based on the data tags; and
aggregating the backup data and the backup metadata to obtain the backup.

3. The remote agent of claim 1, wherein generating the data tags for the client comprises:
for a third portion of client data of the client:
identifying a second person of the persons that repeatedly accessed the third portion of the client data based on system metadata of the client; and
generating a third data tag of the data tags indicating that the third portion of the client data is associated with the second person of the persons that repeatedly accessed the third portion of the client data.

4. The remote agent of claim 1, wherein generating data tags for the client comprises:
for a third portion of client data of the client:
identifying that the third portion of the client data is publicly available; and
generating a third data tag of the data tags indicating that the third portion of the client data does not include the personal information of the person of the persons.

5. The remote agent of claim 1, wherein generating data tags for the client comprises:
making a determination that a third portion of client data of the client is an aggregate data structure;
in response to the determination:
identifying sub-portions of the third portion of the client data; and
generating a portion of the data tags indicating associations between portions of the client data and corresponding sub-portions of the third portion of the client data.

6. The remote agent of claim 1, wherein the backup metadata comprises:
a first entry that associates third portion of the backup data and a plurality of persons of the persons.

7. The remote agent of claim 6, wherein the backup metadata further comprises:

a second entry that specifies that a fourth portion of the backup data is only associated with a single person of the persons.

8. The remote agent of claim 6, wherein the backup metadata further comprises:
a second entry that associates a sub-portion of the third portion of the backup data and a second plurality of persons of the persons.

9. The remote agent of claim 8, wherein the sub-portion of the third portion of the backup data is a smallest addressable data unit of a database.

10. A method for providing data protection services to clients based on lifecycle policies that specify when backups of the clients are to be generated and privacy policies that specify a classification system for data of the clients which discriminates portions of the data of the clients that comprise personal information from other portions of the data of the clients that do not comprise personal information, comprising:
instantiating a backup agent in a client of the clients in response to a backup generation for the client, wherein the backup generation is specified by the lifecycle policies;
using the backup agent:
generating a backup using the privacy policies comprising:
backup data for the client,
data tags for the client, and
backup metadata that associates portions of the backup data with respective persons; and
storing the backup in backup storage based on the lifecycle policies,
wherein generating data tags for the client comprises:
for a first portion of client data of the client:
identifying that the first portion of the client data includes personal information of a person of the persons based on the privacy policies; and
generating a first data tag of the data tags comprising information indicating that the first portion of the client data is confidential, wherein the first data tag further comprises a first data portion identifier identifying the first portion of the client data and person association information including the personal information of the person of the persons; and
for a second portion of client data of the client:
identifying that the second portion of the client data does not include the personal information of the person of the persons based on the privacy policies; and
generating a second data tag of the data tags comprising information indicating a confidentiality status of the second portion of the client data that does not include the personal information of the person of the persons, wherein the second data tag further comprises a second data portion identifier identifying the second portion of the client data and the person association information including the personal information of the person of the persons.

11. The method of claim 10, wherein generating the backup using the privacy policies comprises:
generating the backup data;
generating the backup metadata based on the data tags; and
aggregating the backup data and the backup metadata to obtain the backup.

12. The method of claim 10, wherein generating the data tags for the client comprises:
for a third portion of client data of the client:
identifying a second person of the persons that repeatedly accessed the third portion of the client data based on system metadata of the client; and
generating a third data tag of the data tags indicating that the third portion of the client data is associated with the second person of the persons that repeatedly accessed the third portion of the client data.

13. The method of claim 10, wherein generating data tags for the client comprises:
for a third portion of client data of the client:
identifying that the third portion of the client data is publicly available; and
generating a third data tag of the data tags indicating that the third portion of the client data does not include the personal information of the person of the persons.

14. A non-transitory computer readable medium comprising computer readable program code, which when executed by a computer processor enables the computer processor to perform a method for providing data protection services to clients based on lifecycle policies that specify when backups of the clients are to be generated and privacy policies that specify a classification system for data of the clients which discriminates portions of the data of the clients that comprise personal information from other portions of the data of the clients that do not comprise personal information, the method comprising:
instantiating a backup agent in a client of the clients in response to a backup generation for the client, wherein the backup generation is specified by the lifecycle policies; and
using the backup agent:
generating a backup using the privacy policies comprising:
backup data for the client,
data tags for the client, and
backup metadata that associates portions of the backup data with respective persons; and
storing the backup in backup storage based on the lifecycle policies,
wherein generating data tags for the client comprises:
for a first portion of client data of the client:
identifying that the portion of the client data includes personal information of a person of the persons based on the privacy policies;
generating a first data tag of the data tags comprising information indicating that the first portion of the client data is confidential, wherein the first data tag further comprises a first data portion identifier identifying the first portion of the client data and person association information including the personal information of the person of the persons;
for a second portion of client data of the client:
identifying that the second portion of the client data does not include the personal information of the person of the persons based on the privacy policies; and
generating a second data tag of the data tags comprising information indicating a confidentiality status of the second portion of the client data that does not include the personal information of the person of the persons, wherein the second data tag further comprises a second data portion identifier identifying the second portion of the client data and the person association information including the personal information of the person of the persons.

15. The non-transitory computer readable medium of claim 14, wherein generating the backup using the privacy policies comprises:
   generating the backup data;
   generating the backup metadata based on the data tags; and
   aggregating the backup data and the backup metadata to obtain the backup.

16. The non-transitory computer readable medium of claim 14, wherein generating data tags for the client comprises:
   for a third portion of client data of the client:
      identifying a second person of the persons that repeatedly accessed the third portion of the client data based on system metadata of the client; and
      generating a third data tag of the data tags indicating that the third portion of the client data is associated with the second person of the persons that repeatedly accessed the third portion of the client data.

17. The non-transitory computer readable medium of claim 14, wherein generating data tags for the client comprises:
   for a third portion of client data of the client:
      identifying that the third portion of the client data is publicly available; and
      generating a third data tag of the data tags indicating that the third portion of the client data does not include the personal information of the person of the persons.

* * * * *